United States Patent [19]

Senoo et al.

[11] Patent Number: 5,112,759
[45] Date of Patent: May 12, 1992

[54] ELECTROPHOTOGRAPHIC PHOTOSENSITIVE MEMBER

[75] Inventors: Akihiro Senoo; Kazushi Iuchi; Hajime Miyazaki; Shintetsu Go, all of Yokohama; Toshie Miyaji, Kawasaki, all of Japan

[73] Assignee: Canon Kabushiki Kaisha, Tokyo, Japan

[21] Appl. No.: 501,880

[22] Filed: Mar. 30, 1990

[30] Foreign Application Priority Data

Mar. 30, 1989 [JP] Japan ................................. 1-80876
Mar. 30, 1989 [JP] Japan ................................. 1-80877
Jun. 12, 1989 [JP] Japan ................................. 1-146861
Jul. 14, 1989 [JP] Japan ................................. 1-180230

[51] Int. Cl.5 .................... G03G 5/047; G03G 5/06
[52] U.S. Cl. ............................... 430/58; 430/59; 430/72; 430/74; 430/75; 430/76; 430/77; 430/78; 430/79; 430/900; 355/211; 358/302
[58] Field of Search ................... 430/58, 59, 72, 74, 430/75, 76, 77, 78, 79, 900

[56] References Cited

U.S. PATENT DOCUMENTS 3,955,978  5/1976  Rochlitz et al. ............ 430/72 X
3,973,959  8/1976  Rochlitz et al. ............ 430/78 X
4,609,602  9/1986  Ong et al. ................. 430/72 X
4,621,038  6/1986  Kazmaier et al. .............. 430/59
5,034,294  7/1991  Go et al. ..................... 430/58

FOREIGN PATENT DOCUMENTS 188043  11/1982  Japan.
201236  12/1982  Japan ..................... 430/76
49546   3/1984  Japan.

Primary Examiner—Roland Martin

Attorney, Agent, or Firm—Fitzpatrick, Cella, Harper & Scinto

[57] ABSTRACT

An electrophotographic photosensitive member comprises an electroconductive support and a photosensitive layer laid on the electroconductive support, the photosensitive layer containing a compound represented by the following general formula (1):

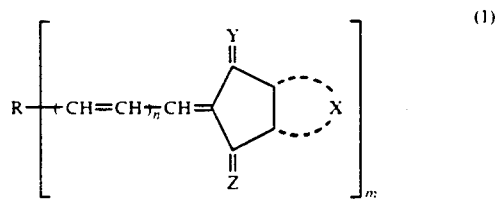

wherein R in a substituted or unsubstituted aromatic group or heterocyclic group; X is substituted or unsubstituted benzenediyl, 2,3-pyridinediyl, 3,4-pyridinediyl or 2,3-pyrazinediyl; Y is an oxygen atom, a sulfur atom or a dicyanomethylene group, Z is an oxygen atom, a sulfur atom, a dicyanomethylene group or

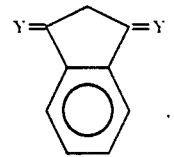

m is an integer of 1 2 or 3; and n is an integer of 0 or 1.

11 Claims, 1 Drawing Sheet

ELECTROPHOTOGRAPHIC PHOTOSENSITIVE MEMBER

BACKGROUND OF THE INVENTION

1. Field of the Invention

This invention relates to an electrophotographic photosensitive member, and more particularly to an electrophotographic photosensitive member having a photosensitive member containing a polymethine compound of specific structure.

2. Related Background Art

Known electrophotographic photosensitive members using an organophotoconductive material include those using a photoconductive polymer such as poly-N-vinylcarbazol or a low molecular weight, organophotoconductive material such as 2,5-bis(p-diethylaminophenyl)-1,3,4-oxadiazole, or those using combinations of the organophotoconductive material with various dyes or pigments.

An electrophotographic photosensitive member containing an organophotoconductive material has advantages such as a good film formability, a capability to form a photosensitive layer by coating, a very high productivity and low cost. It has a further advantage such as a free control of color sensitivity upon selection of a sensitizer to be used, such as dyes or pigments, and has been widely studied. Particularly with recent developments of the function-separated type photosensitive member based on a lamination of a charge generation layer containing an organophotoconductive dye or pigment and a charge transports layer containing the above-mentioned photoconductive polymer or low molecular weight, organoelectroconductive material, considerable improvements have been made on the sensitivity and durability, which have been regarded as disadvantages of the conventional organic electrophotographic photosensitive members.

A polymethine coloring matter has a methine chain connected with a conjugated double bond within a molecule and thus has an absorption range extending from the visible to the near infrared zone by $\pi-\pi^*$ transition. Thus, intense development has been made on the ground of the functional coloring matter, and a large number of compounds have been so far proposed. For example, squarium pigment, [Japanese Patent Application Laid-open No. 62-450, etc.], cyanine coloring matter [Japanese Patent Application Laid-open Nos. 57-188043 and 59-49546] are well known. However, generally the conventional polymethine pigment has a low light resistance and it is often not satisfactory in potential stability when repeatedly used. Its practical application is limited, for example, to recording materials, etc.

SUMMARY OF THE INVENTION

An object of the present invention is to overcome the above-mentioned disadvantages and to provide an electrophotographic photosensitive member having stable potential characteristics when repeatedly used.

That is, the present invention provides an electrophotographic photosensitive member which comprises an electroconductive support and a photosensitive layer laid on the electroconductive support, the photosensitive layer containing a compound represented by the following formula (1):

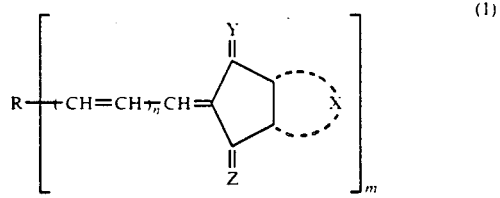

wherein R is a substituted or unsubstituted aromatic group or heterocyclic group; X is substituted or unsubstituted benzenediyl, 2,3-pyridinediyl, 3,4-pyridinediyl or 2,3-pyrazinediyl; Y is an oxygen atom, sulfur atom, dicyanomethylene group; Z is an oxygen atom, sulfur atom, dicyanomethylene group or

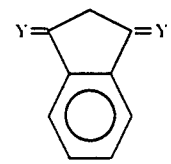

m is an integer of 1, 2 or 3; and n is an integer of 0 or 1.

DETAILED DESCRIPTION OF THE PREFERRED EMBODIMENTS

Figure 1:
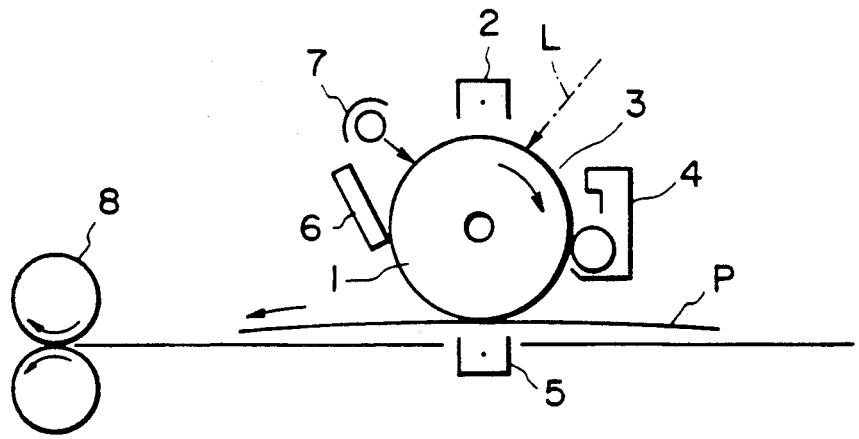
FIG. 1 is a schematic structural view of an electrophotographic apparatus using the present photosensitive member.

Example R in the general formula (1) includes aromatic hydrocarbon rings such as benzene, naphthalene, fluorene, phenanthrene, anthracene, pyrene, azulene, etc.; aromatic ketone rings such as benzophenone, fluorenone, benzanthrone, etc.; aromatic thioketone rings and their dicyanomethylene derivatives; aromatic quinone rings such as benzoquinone, naphthoquinone, anthraquinone, phenanthrequinone, pyrenequinone, etc.; aromatic thioquinone rings and their dicyanomethylene derivatives; aromatic amine groups such as triphenylamine, diphenylamine, diphenylmethylamine, etc.; heterocyclic rings such as furan, thiophene, pyrrole, oxazole, imidazole, pyrazole, pyridine, pyrazine, benzofuran, benzothiophene, indole, benzothiazole, carbazole, phenazine, phenoxazine, acridone, dibenzofuran, dibenzothiophene, benzoxazole, oxadiazole, thiazole, etc.; direct combinations of the above-mentioned aromatic rings and heterocyclic rings or combinations thereof through an aromatic group or non-aromatic group, such as biphenyl, binaphthyl, diphenylamine, triphenylamine, N-methyldiphenylamine, fluorenone, phenanthrenequinone, anthraquinone, benzanthrone, terphenyl, diphenyloxadiazole, stilbene, distyrylbenzene, phenylbenzoxazole, diphenylmethane, diphenylsulfone, diphenylether, benzophenone, tetraphenyl-p-phenylenediamine, tetraphenylbenzidine, N-phenyl-2-pyridylamine, N,N-diphenyl-2-pyridylamine, etc.

The above-mentioned aromatic group or heterocyclic groups may have a substituent. Examples of the substituent include alkyl groups such as methyl, ethyl, propyl, butyl, etc.; alkoxy groups such as methoxy, ethoxy, etc.; halogen atoms such as fluorine, chlorine, bromine, etc.; dialkylamino groups such as dimethylamino, diethylamino, etc.; and hydroxy nitro, cyano, halomethyl, etc.

Particularly preferable Examples of R are electron donor groups, for example, aromatic condensed polycyclic group such as pyrene, perylene, etc., and aromatic amine such as triphenylamine, diphenylamine, etc.

Examples of X include benzenediyl, 2,3-pyridinediyl, 3,4-pyridinediyl and 2,3-pyrazinediyl, and examples of a substituent which X may have, include halogen atoms such as fluorine, chlorine, bromine, etc.; nitro,; cyano; and substituted amino groups such as dimethylamino, diethylamino, etc. When X is a benzenediyl group, it is preferable that the substituent is provided on the third position.

Examples of compounds for use in the present invention will be given below, but the compounds for use in the present invention are not limited thereto.

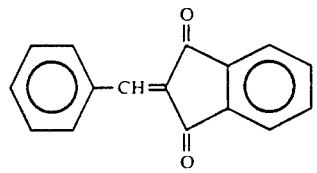

Compound (1)

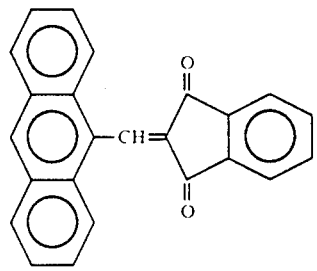

Compound (2)

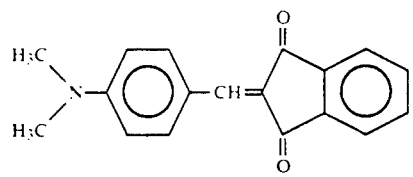

Compound (3)

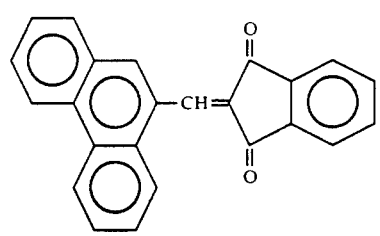

Compound (4)

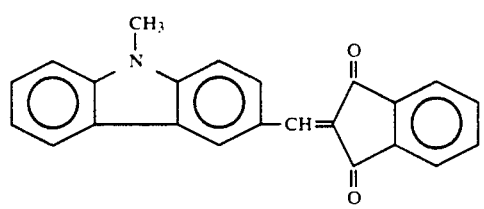

Compound (5)

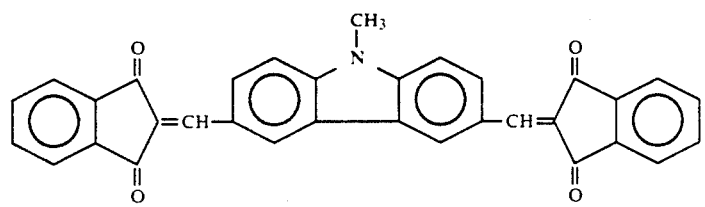

Compound (6)

-continued
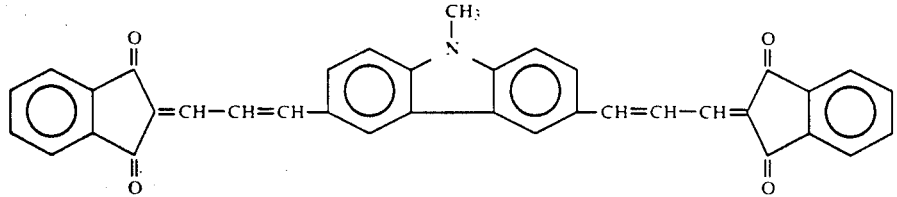
Compound (7)
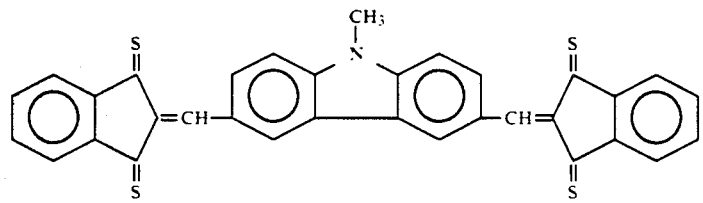
Compound (8)
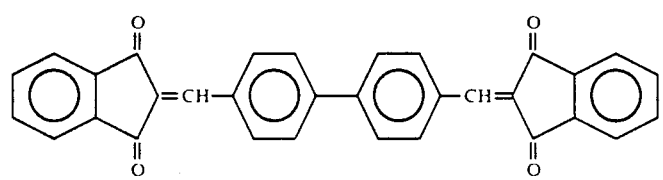
Compound (9)
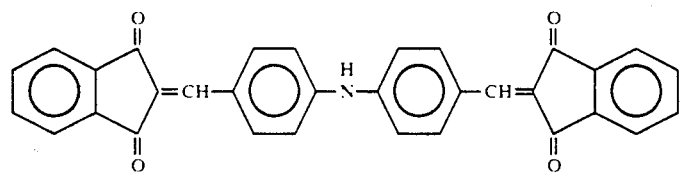
Compound (10)
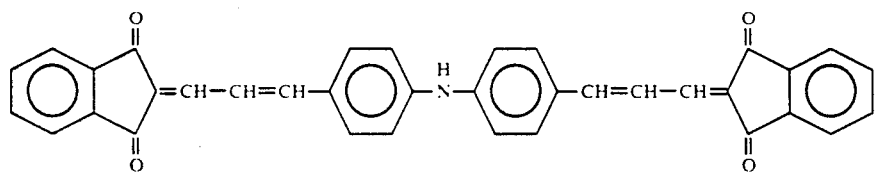
Compound (11)
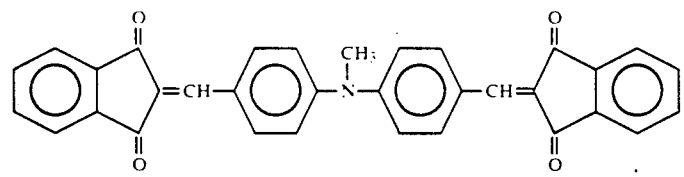
Compound (12)
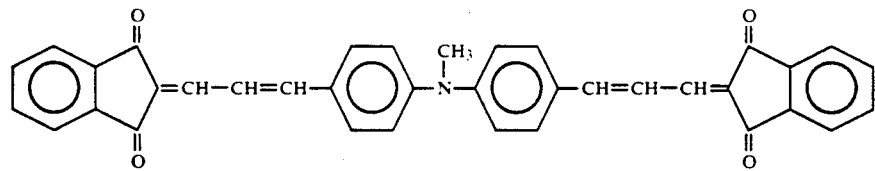
Compound (13)
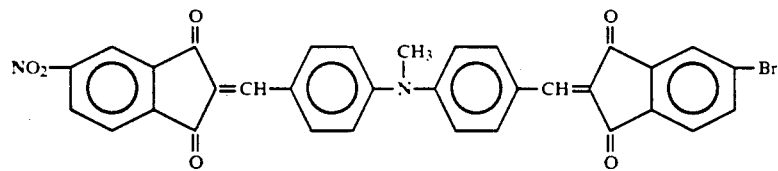
Compound (14)
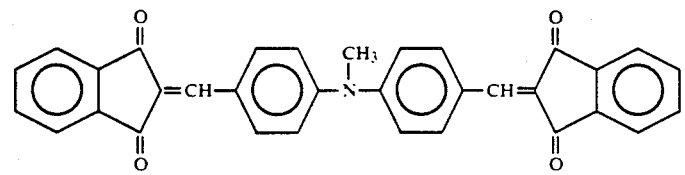
Compound (15)

-continued
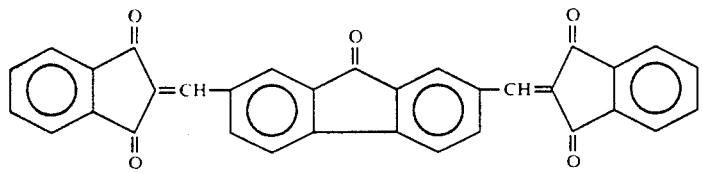
Compound (16)
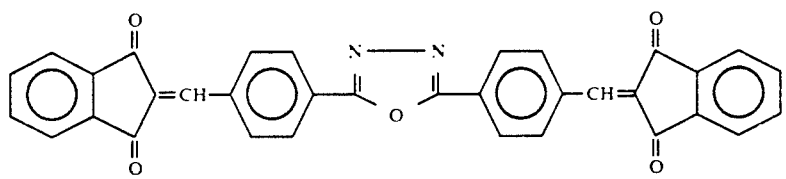
Compound (17)
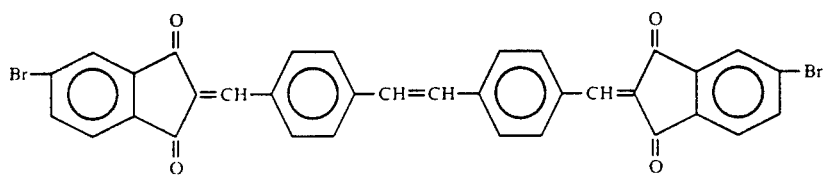
Compound (18)
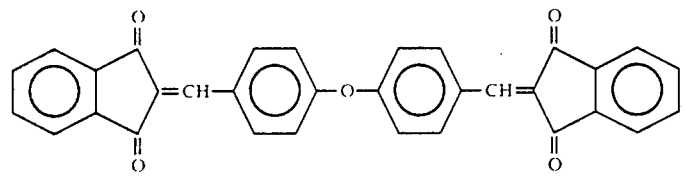
Compound (19)
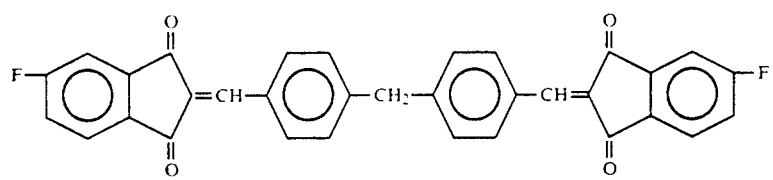
Compound (20)
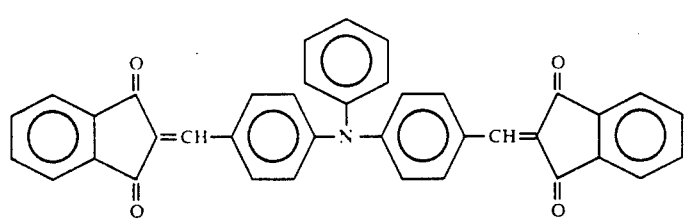
Compound (21)
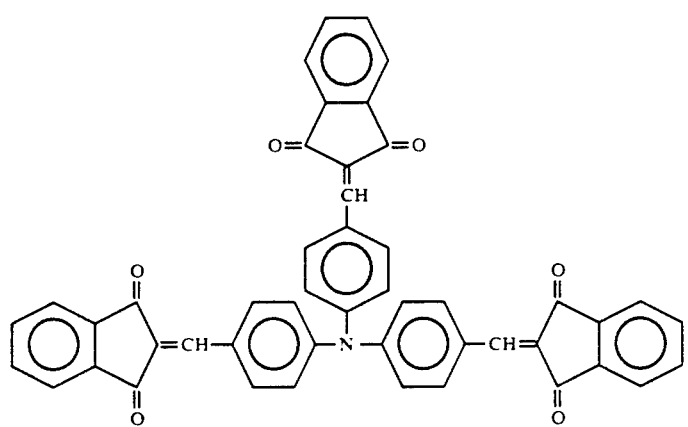
Compound (22)

-continued
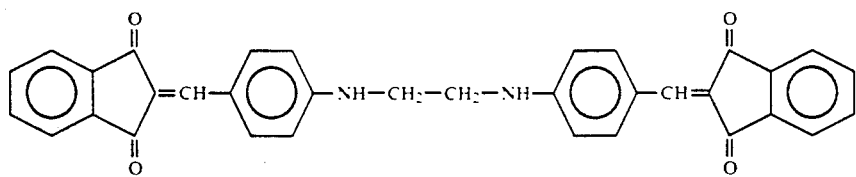
Compound (23)
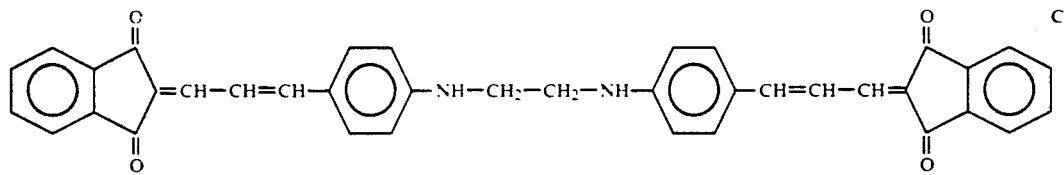
Compound (24)
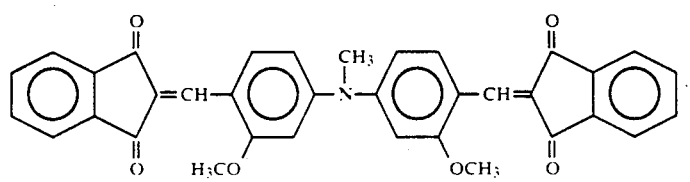
Compound (25)
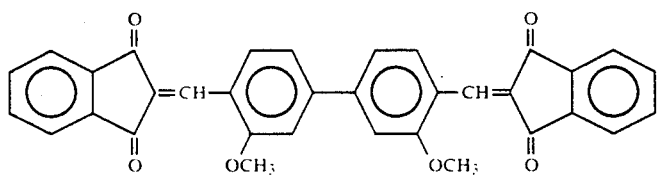
Compound (26)
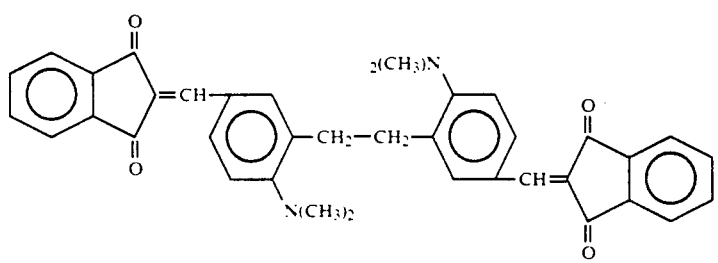
Compound (27)
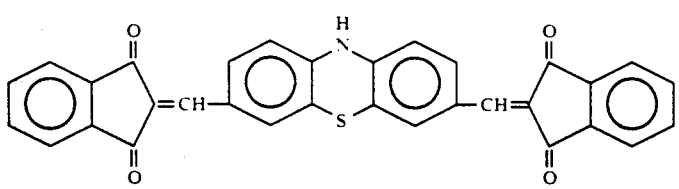
Compound (28)
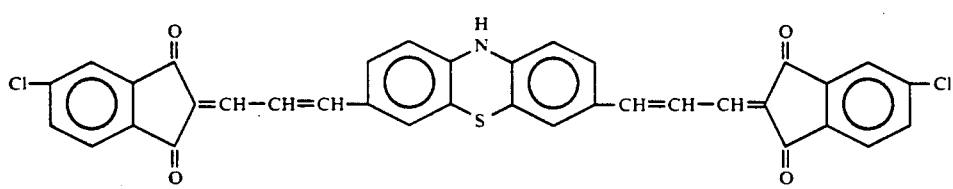
Compound (29)
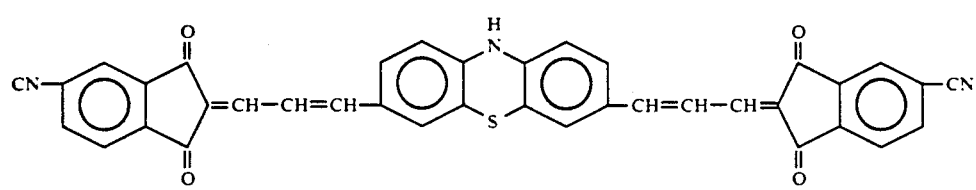
Compound (30)

-continued
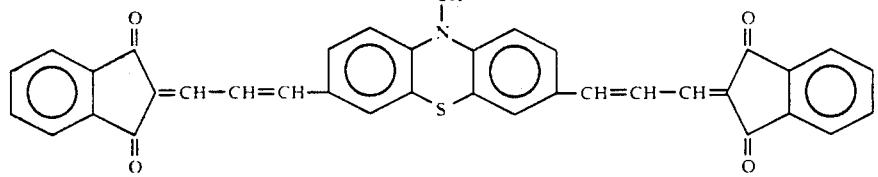
Compound (31)
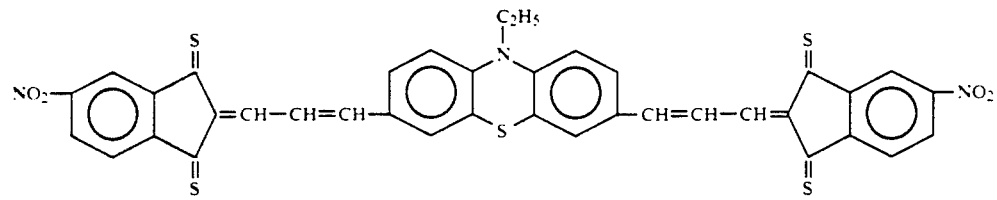
Compound (32)
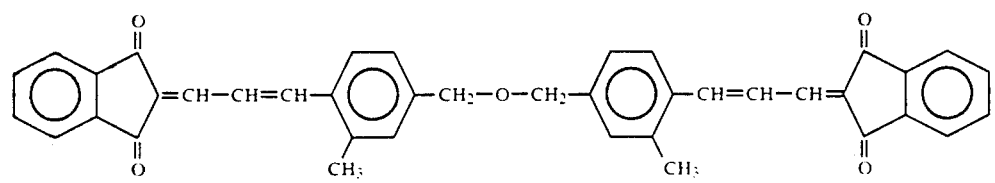
Compound (33)
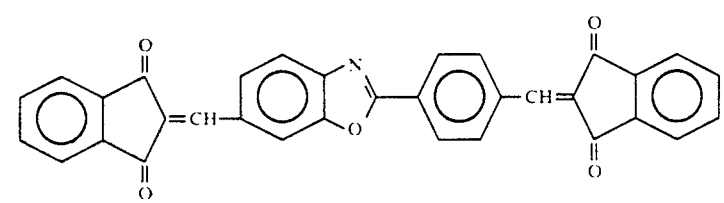
Compound (34)
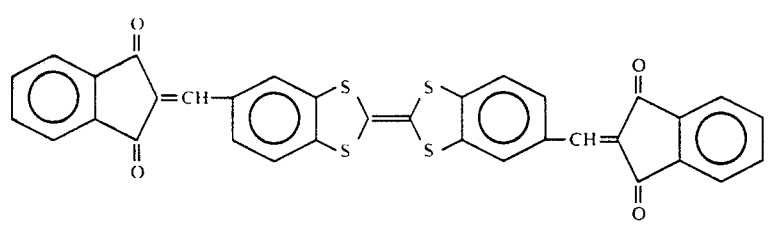
Compound (35)
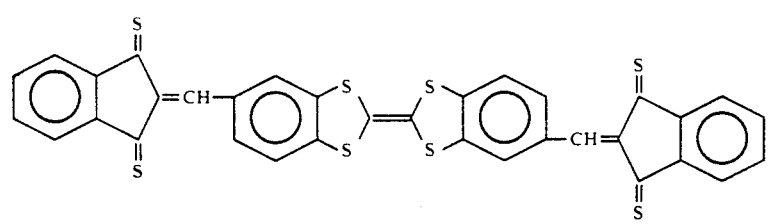
Compound (36)
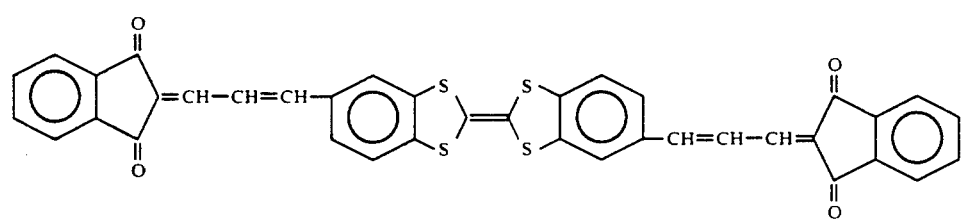
Compound (37)
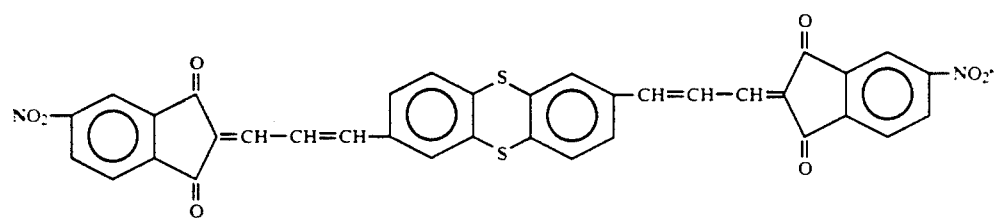
Compound (38)

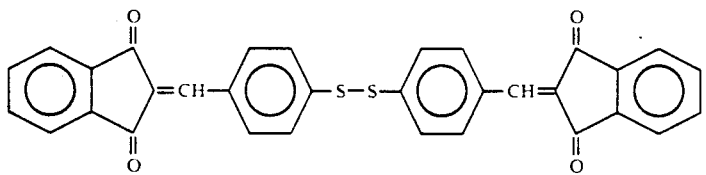
Compound (39)
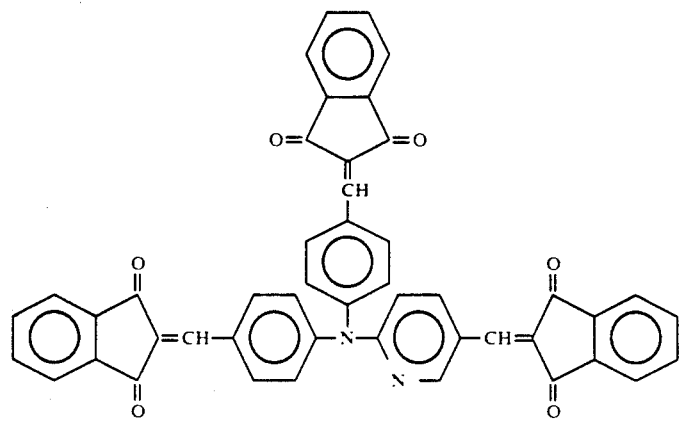
Compound (40)
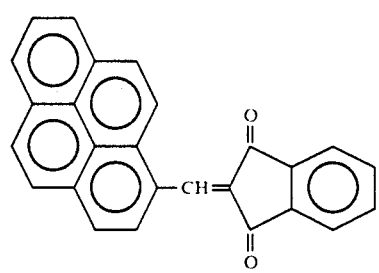
Compound (41)
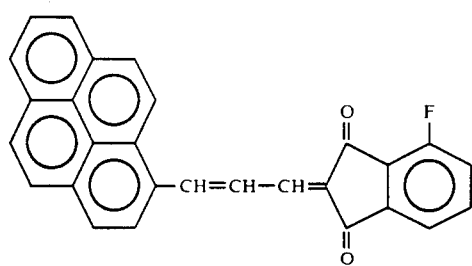
Compound (42)
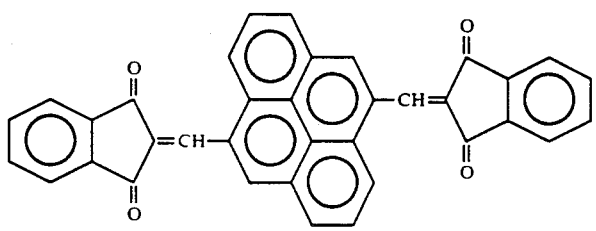
Compound (43)
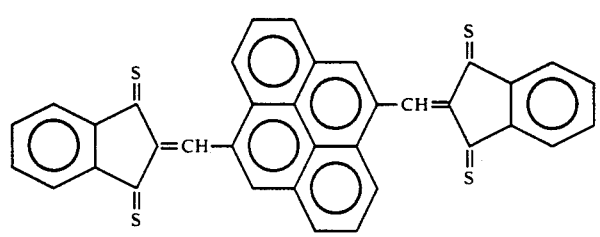
Compound (44)

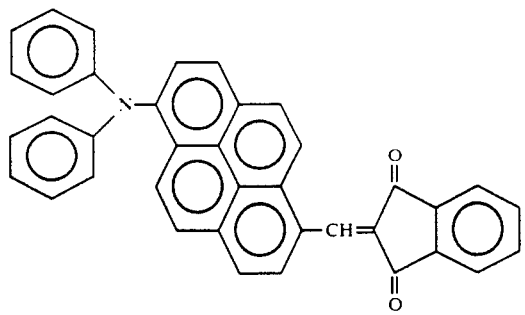
Compound (45)
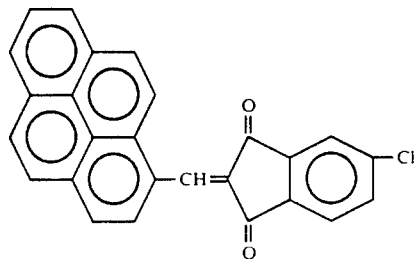
Compound (46)
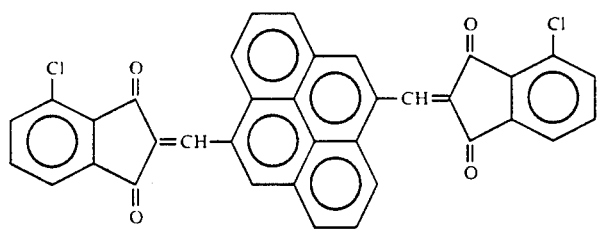
Compound (47)
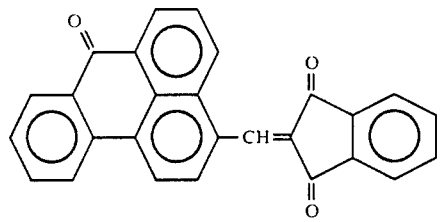
Compound (48)
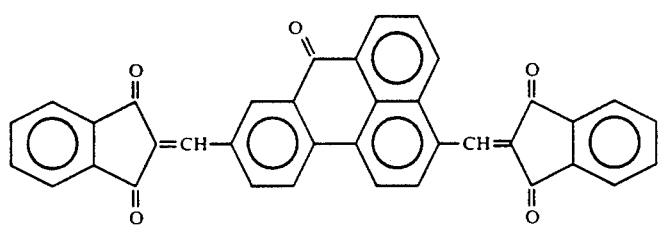
Compound (49)
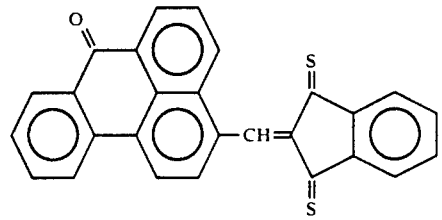
Compound (50)

-continued
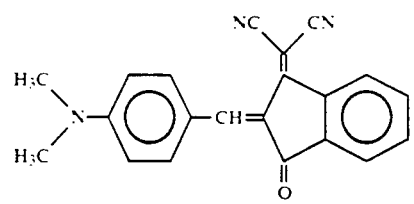
Compound (51)
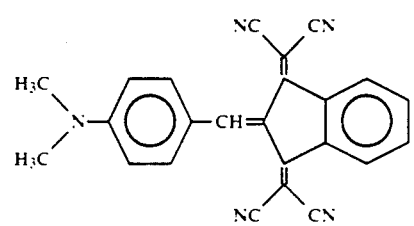
Compound (52)
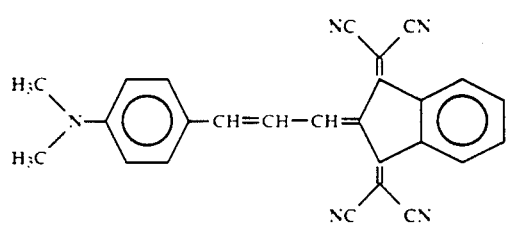
Compound (53)
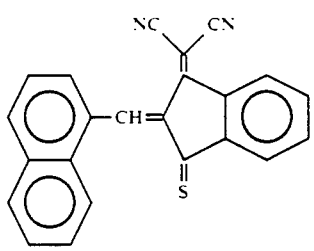
Compound (54)
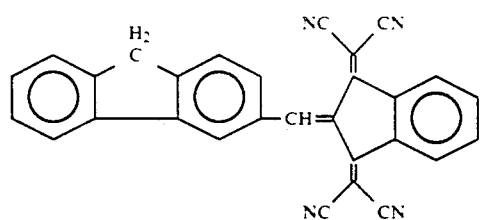
Compound (55)
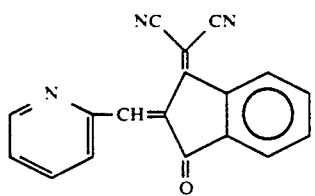
Compound (56)
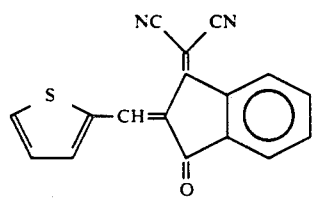
Compound (57)

-continued
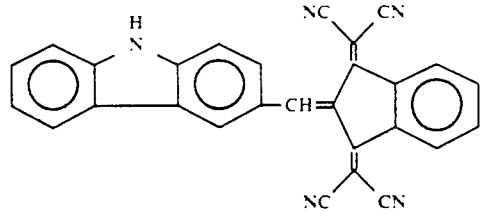
Compound (58)
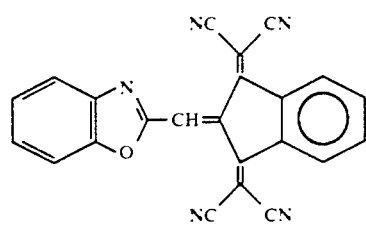
Compound (59)
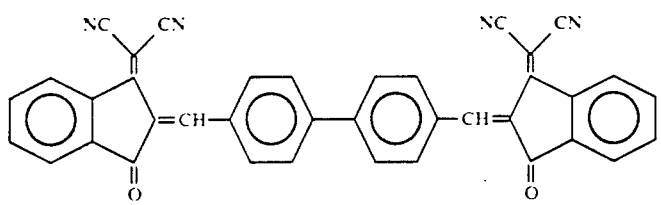
Compound (60)
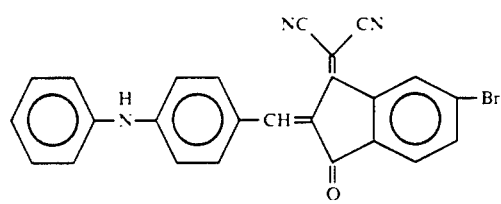
Compound (61)
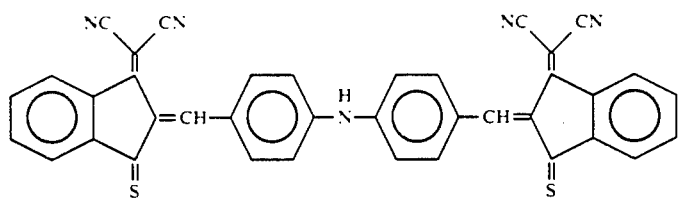
Compound (62)
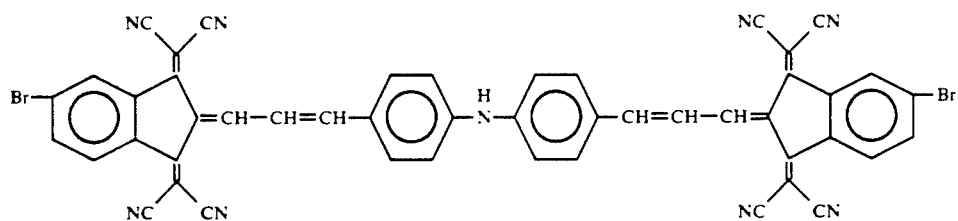
Compound (63)
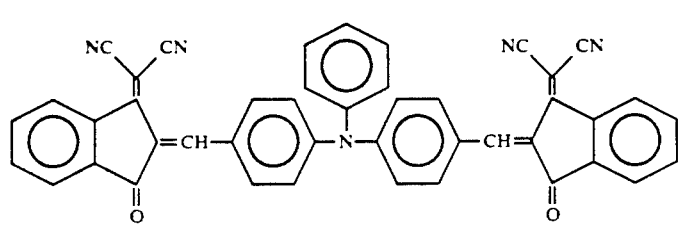
Compound (64)

Compound (65)
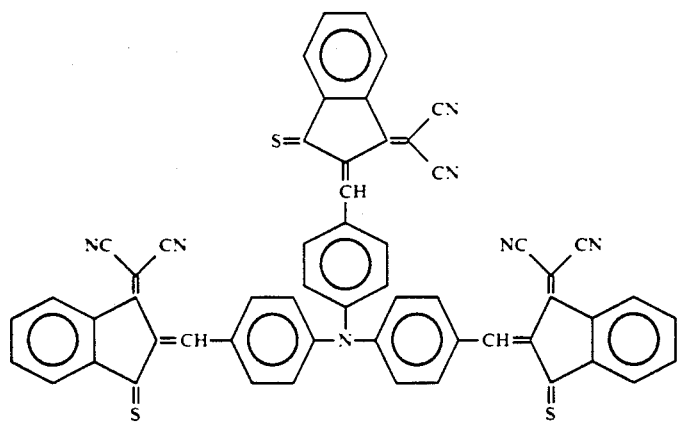
Compound (66)
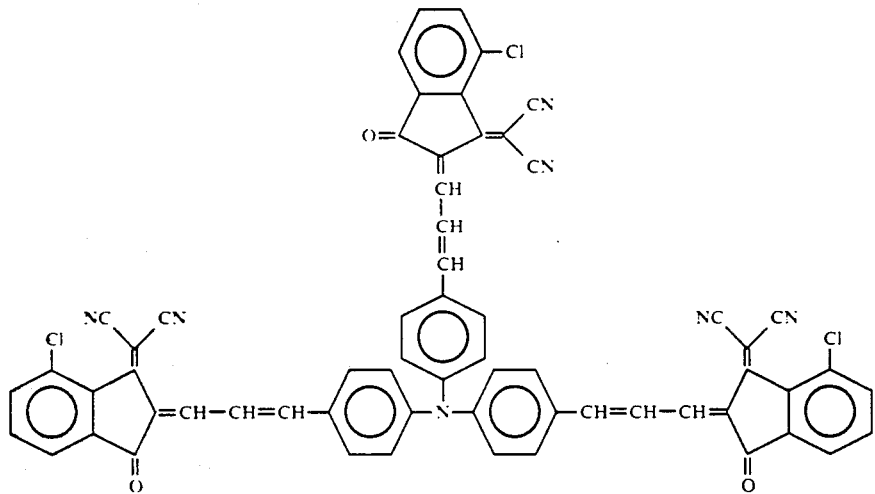
Compound (67)
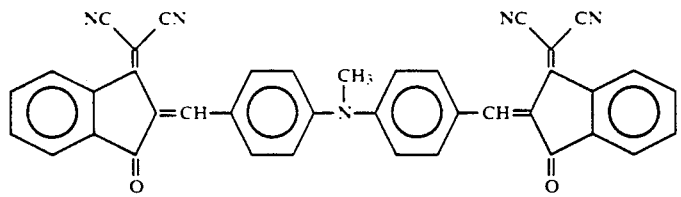
Compound (68)
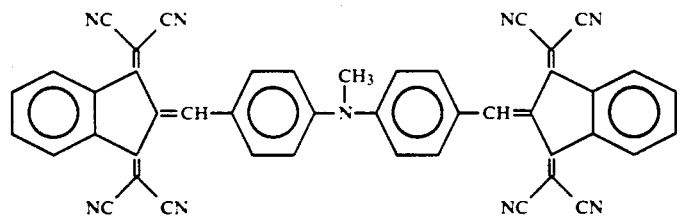
Compound (69)
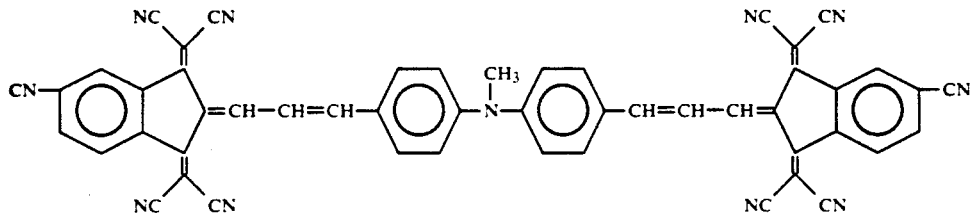

-continued
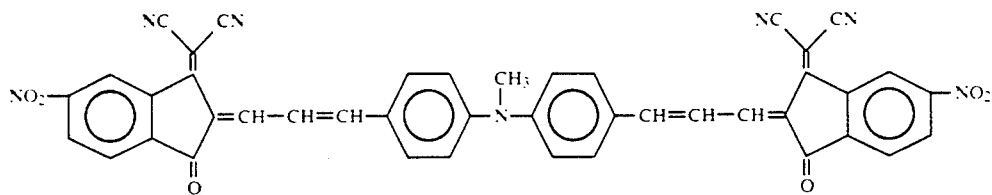
Compound (70)
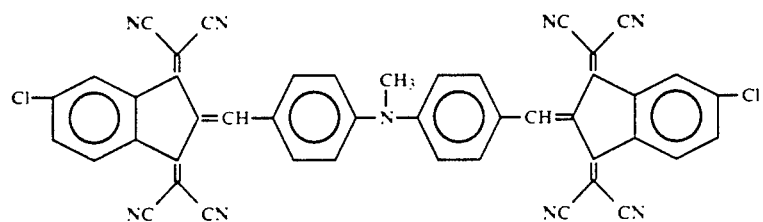
Compound (71)
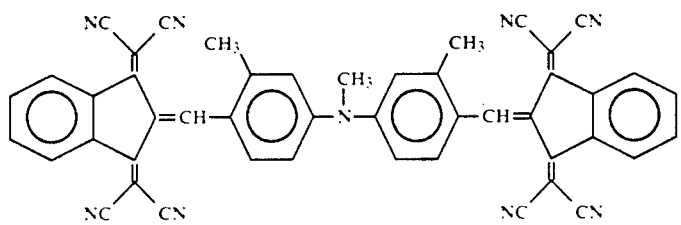
Compound (72)
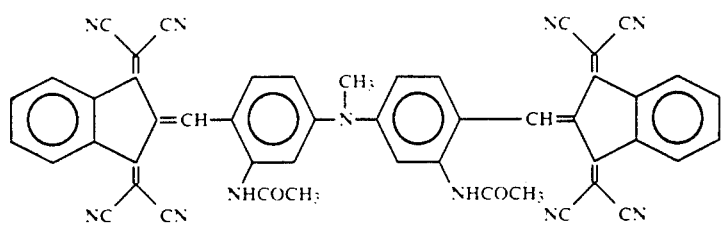
Compound (73)
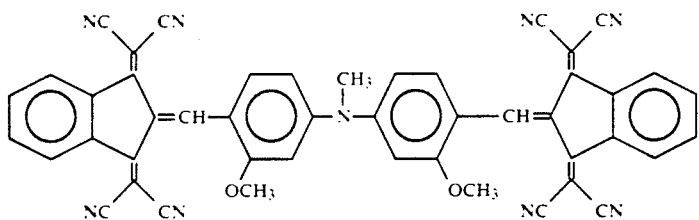
Compound (74)
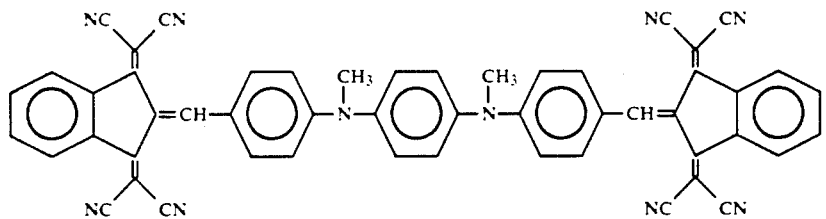
Compound (75)
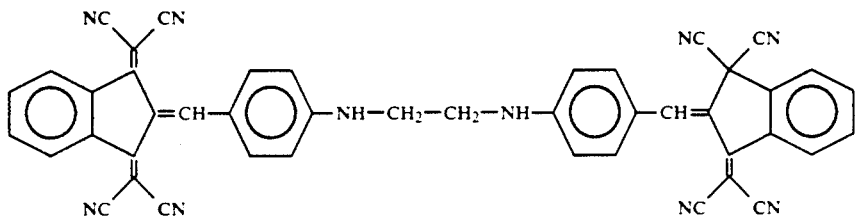
Compound (76)

-continued
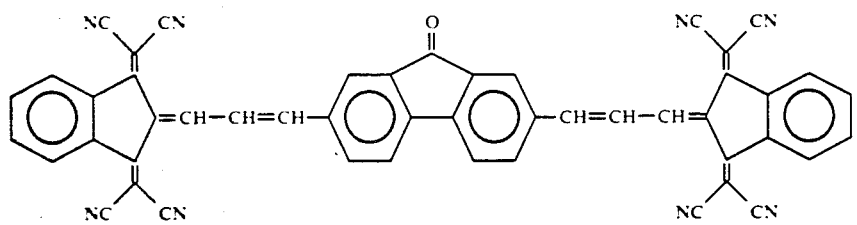
Compound (77)
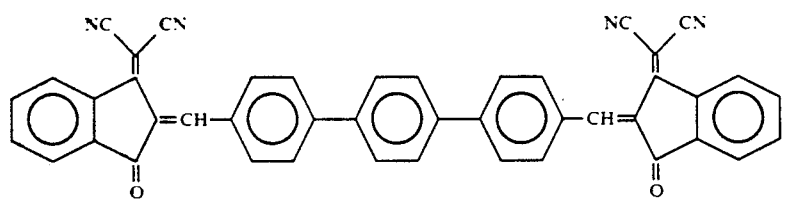
Compound (78)
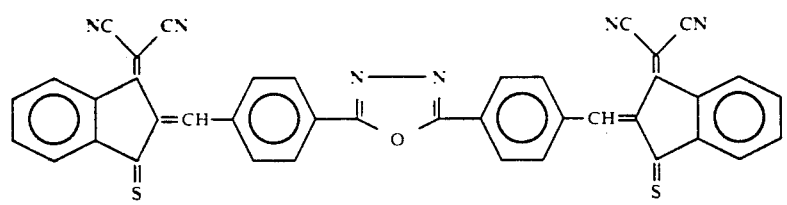
Compound (79)
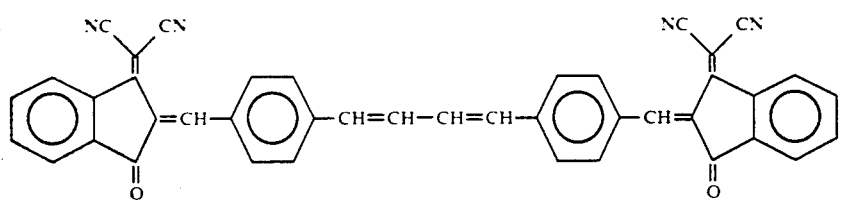
Compound (80)
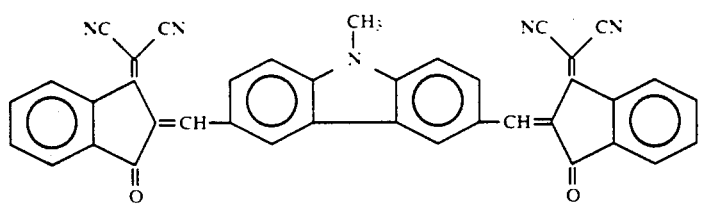
Compound (81)
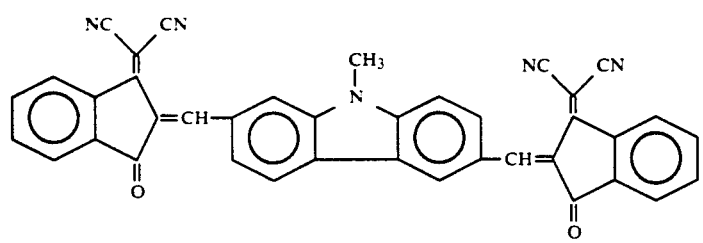
Compound (82)
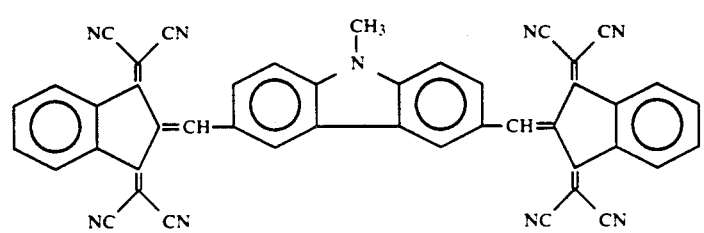
Compound (83)

-continued
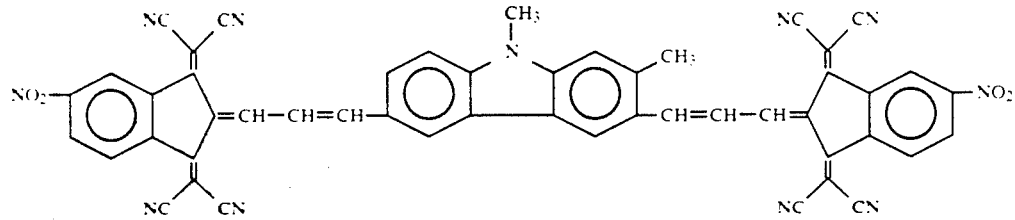
Compound (84)
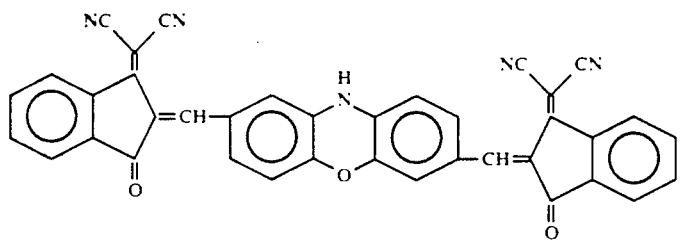
Compound (85)
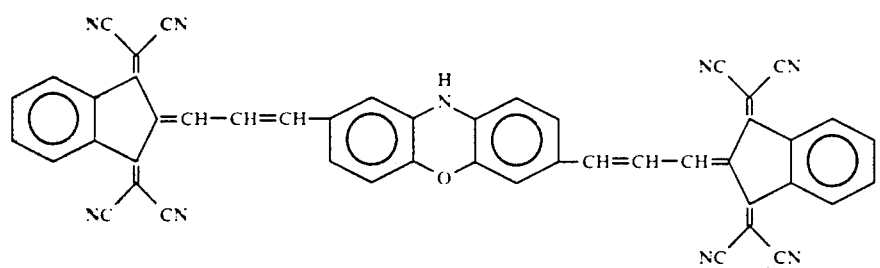
Compound (86)
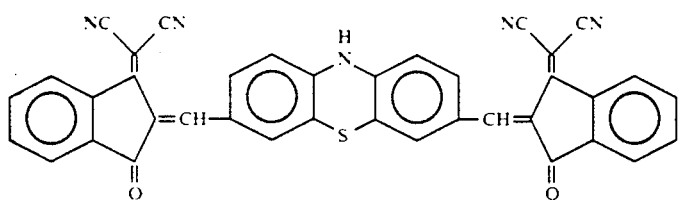
Compound (87)
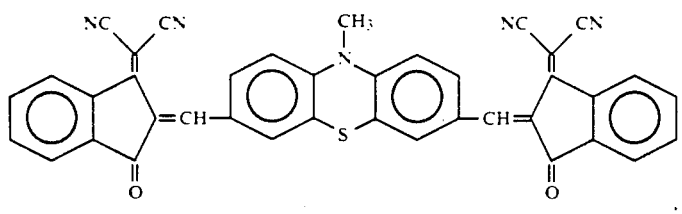
Compound (88)
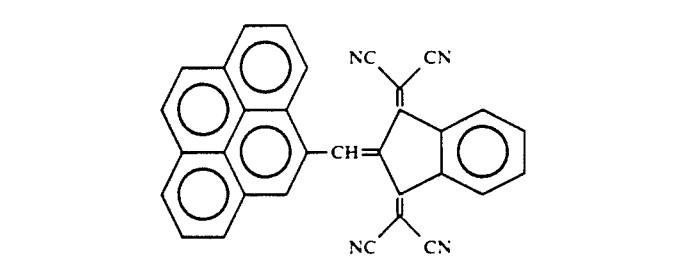
Compound (89)
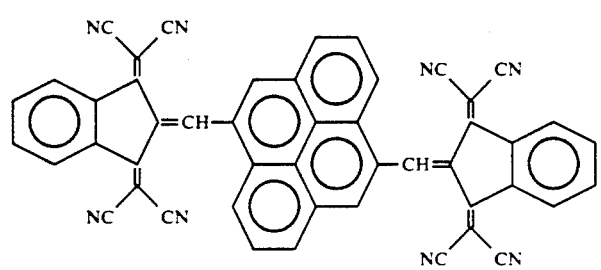
Compound (90)

-continued
Compound (91)
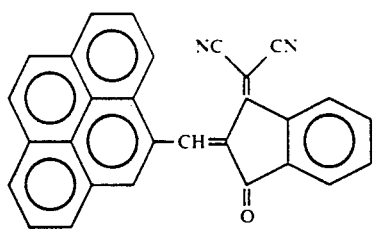
Compound (92)
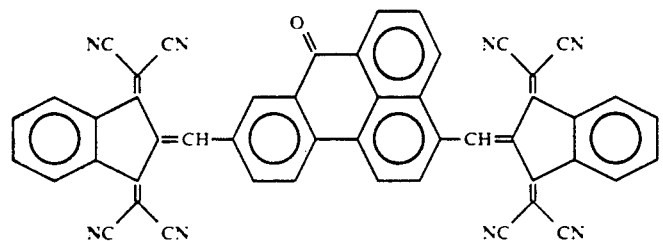
Compound (93)
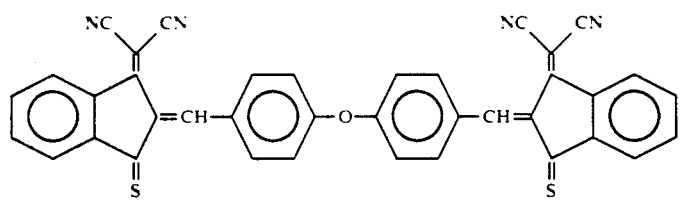
Compound (94)
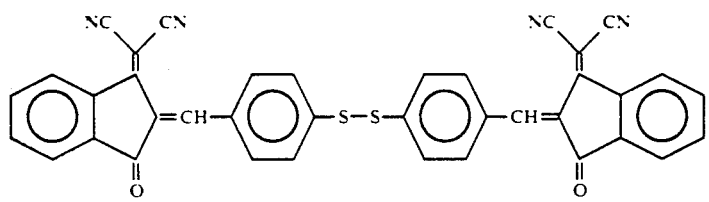
Compound (95)
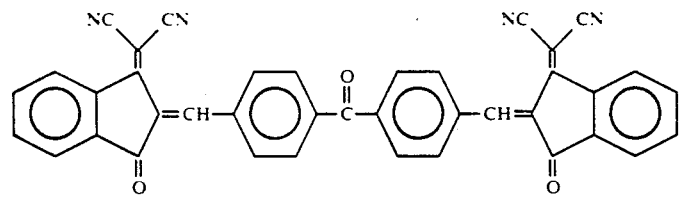
Compound (96)
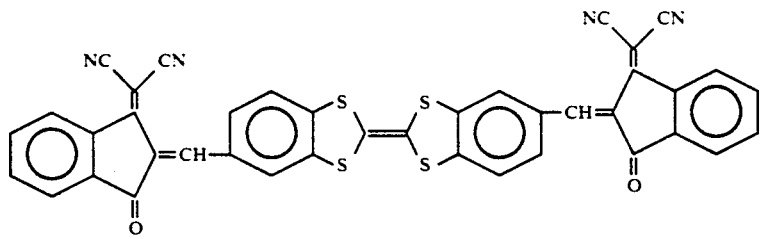
Compound (97)
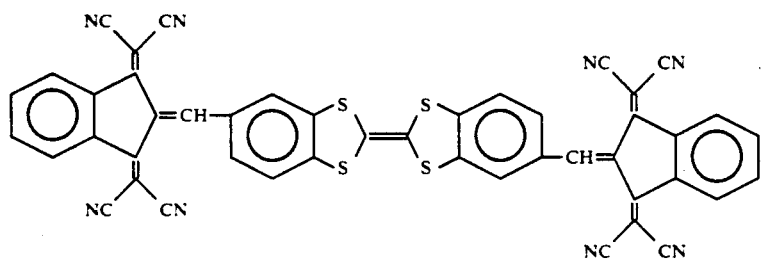

-continued
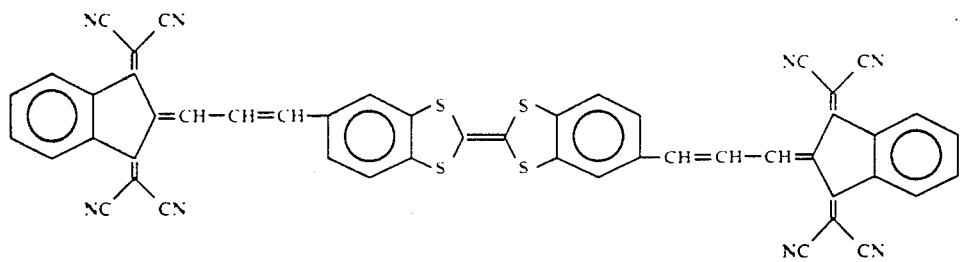
Compound (98)
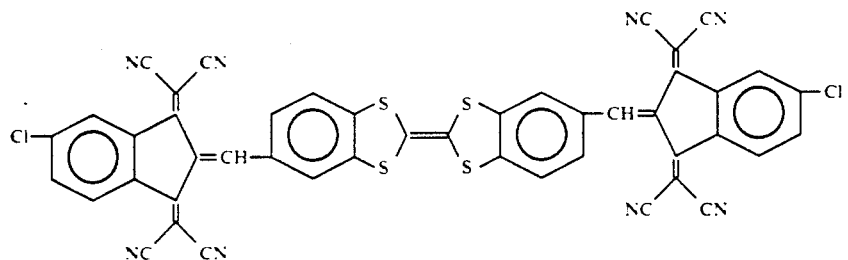
Compound (99)
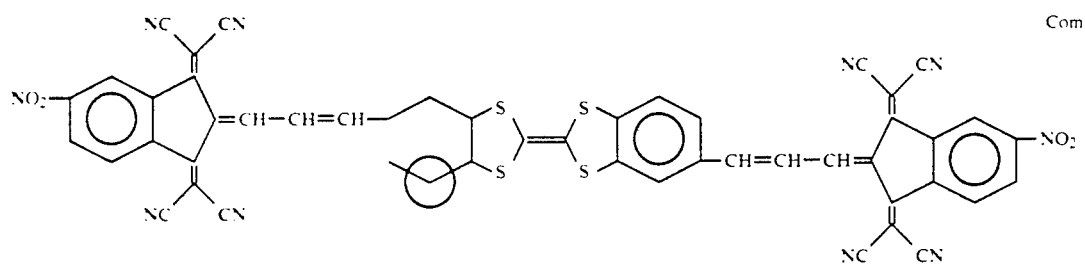
Compound (100)
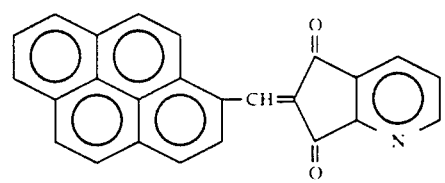
Compound (101)
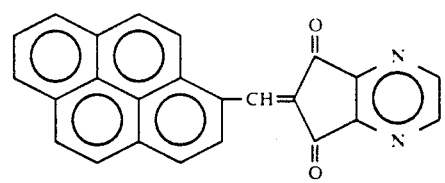
Compound (102)
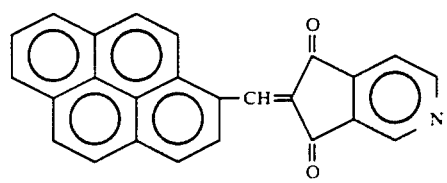
Compound (103)
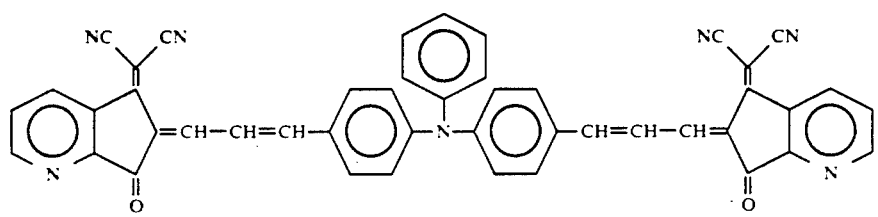
Compound (104)

-continued
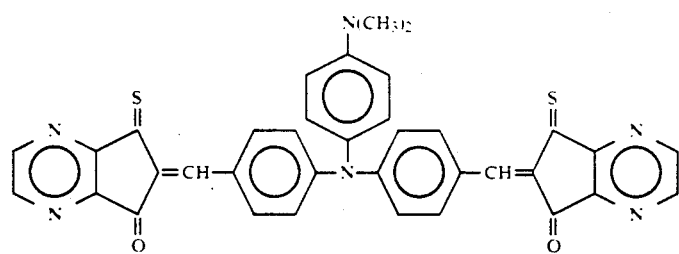
Compound (105)
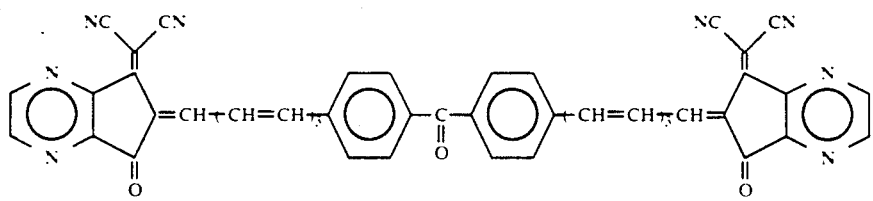
Compound (106)
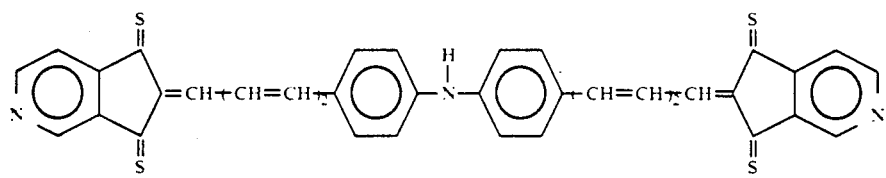
Compound (107)
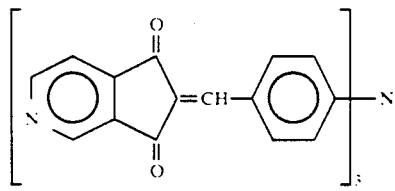
Compound (108)
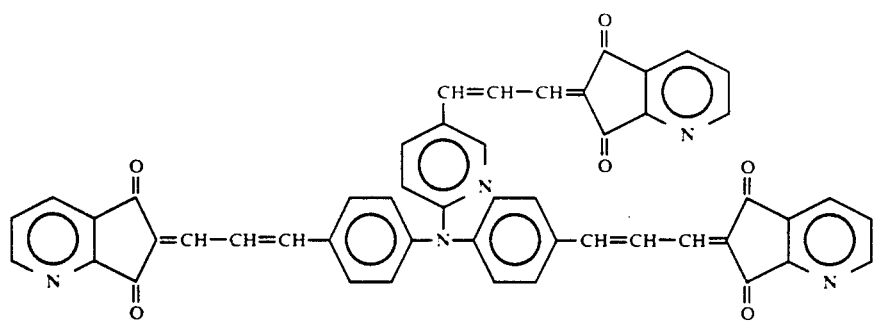
Compound (109)
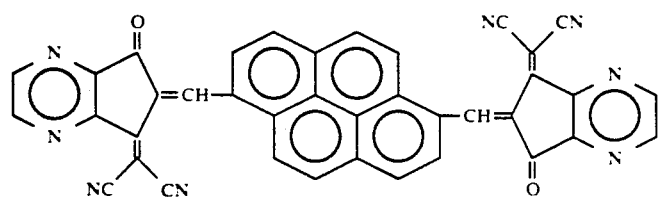
Compound (110)

-continued
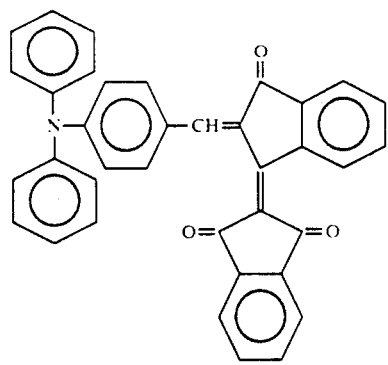
Compound (111)
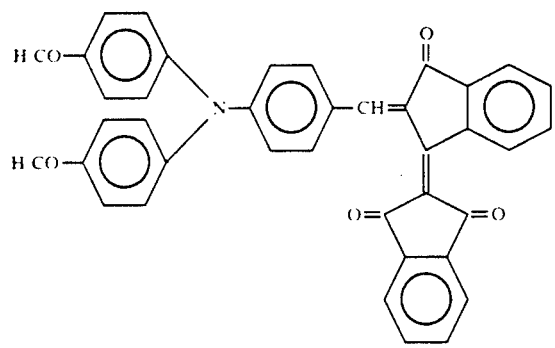
Compound (112)
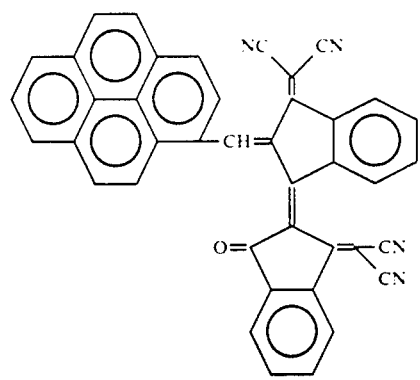
Compound (113)
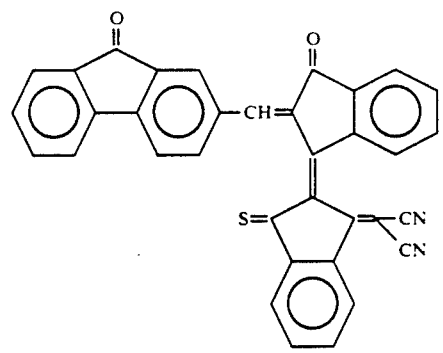
Compound (114)

-continued
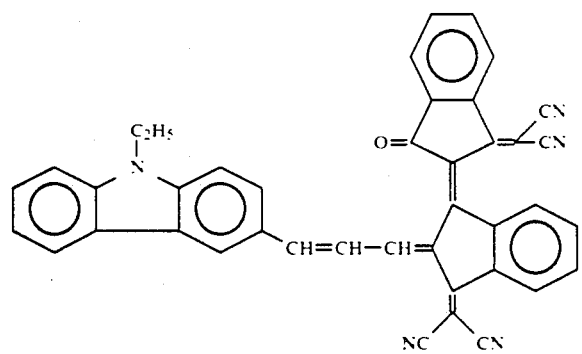
Compound (115)
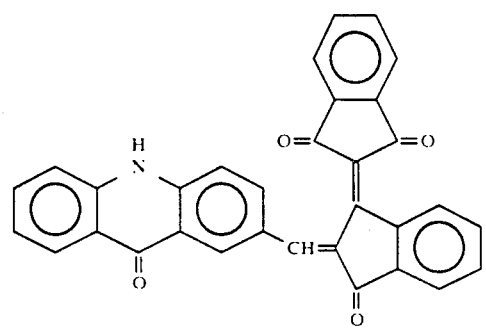
Compound (116)
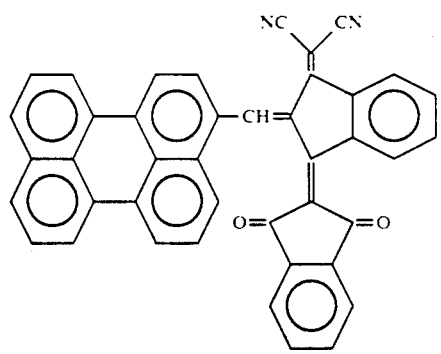
Compound (117)
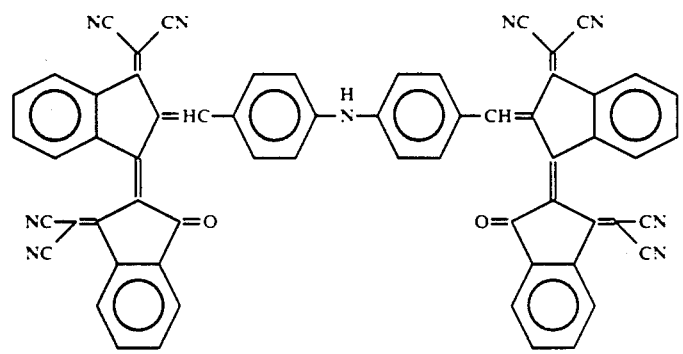
Compound (118)

-continued
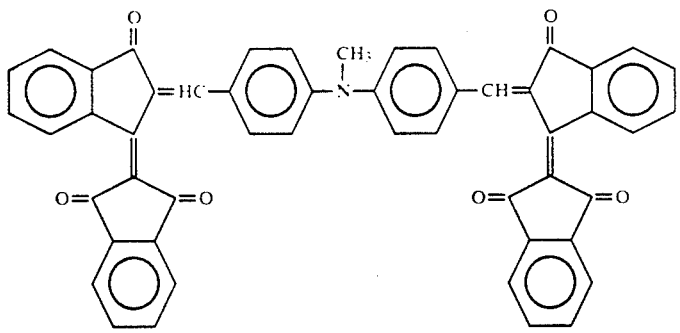
Compound (119)
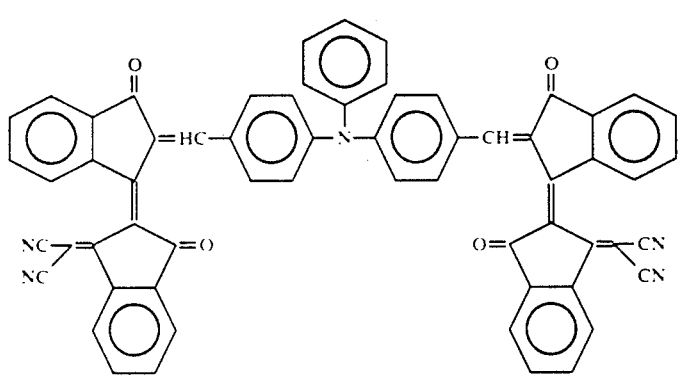
Compound (120)
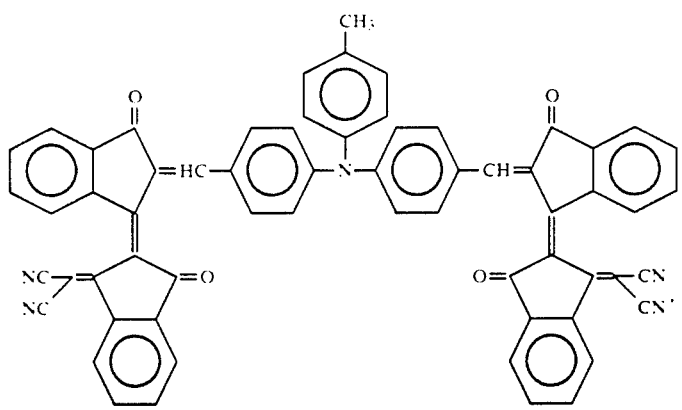
Compound (121)
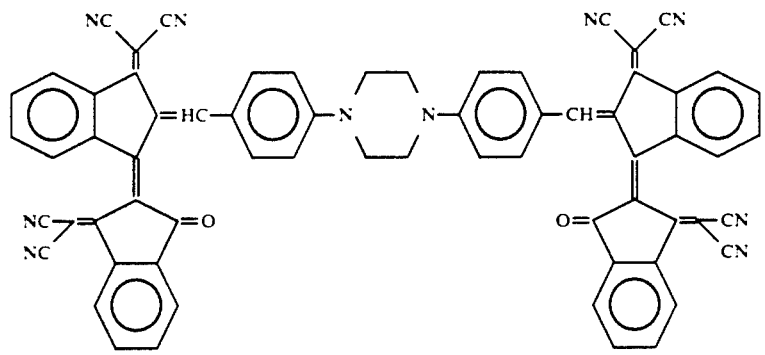
Compound (122)

-continued
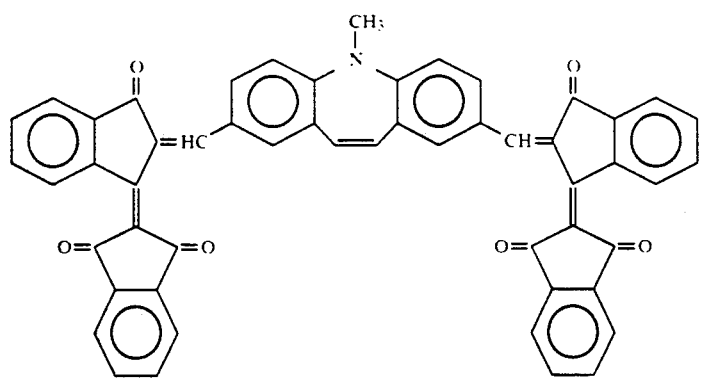
Compound (123)
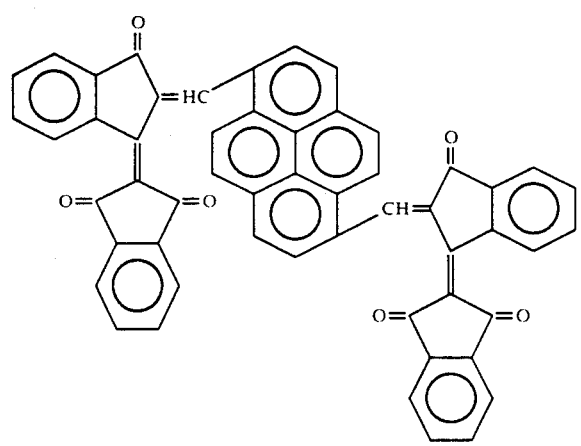
Compound (124)
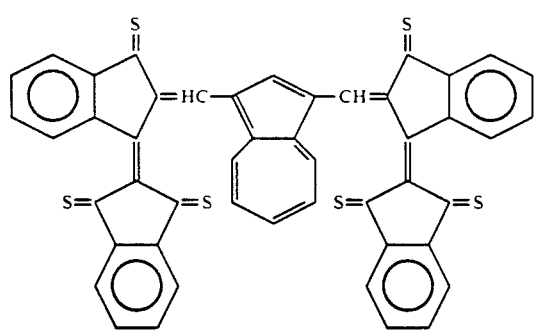
Compound (125)
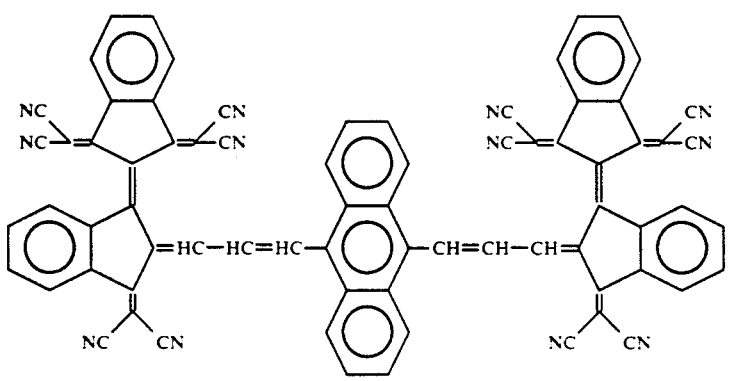
Compound (126)

-continued
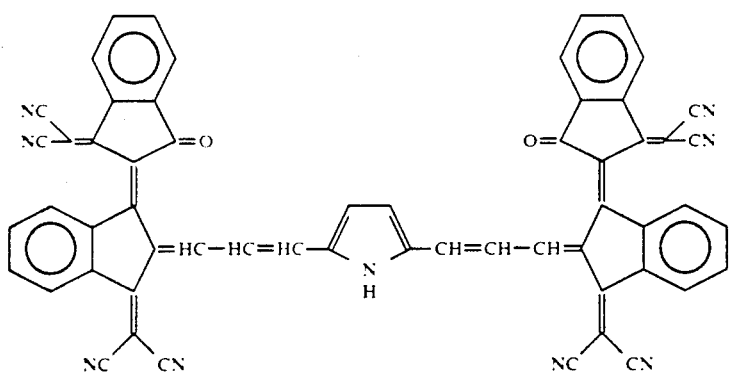
Compound (127)
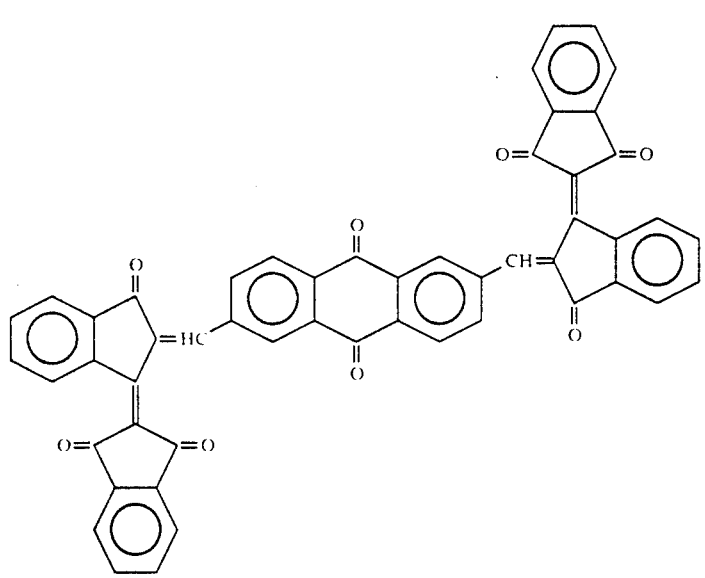
Compound (128)
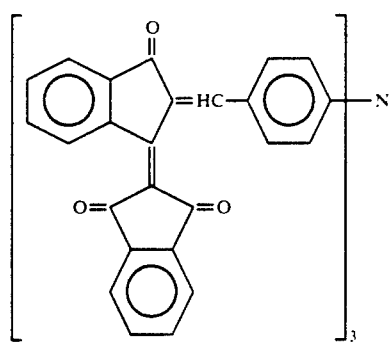
Compound (129)

-continued

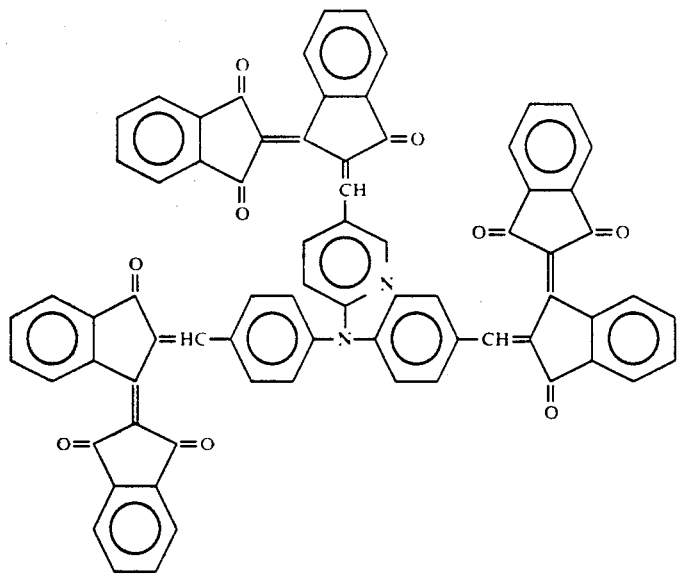

Compound (130)

SYNTHESIS EXAMPLE 1 [SYNTHESIS OF COMPOUND (12)]

100 ml of ethanol and 2.0 g (8.37 mmoles) of aldehyde were placed into a 200-ml three-neck flask and the aldehyde was dissolved in the ethanol with heating and stirring. Then, 2.6 g (17.6 mmoles) of indenedion was added to the solution, and after addition of a small amount of piperidine thereto, the mixture was refluxed with stirring for one hour. Then, the resulting crystals were washed twice with hot ethanol and vacuum dried. Yield: 3.53 g (85.1%).

SYNTHESIS EXAMPLE 2 [SYNTHESIS OF COMPOUND (67)]

150 ml of ethanol and 2.0 g (8.37 mmoles) of aldehyde were placed into a 200-ml three-neck flask and the aldehyde was dissolved in the ethanol with stirring. Then, 3.4 g (17.6 mmoles) of dicyanomethyleneindanon was added thereto, and after addition of a small amount of piperidine thereto, the mixture was refluxed with stirring for 45 minutes. The resulting crystals were washed twice with hot ethanol and vacuum dried. Yield: 4.24 g (85.7%)

SYNTHESIS EXAMPLE 3 [SYNTHESIS OF COMPOUND (101)]

1.00 g of a compound (II) of the following structure was dissolved in 50 ml of ethanol with heating, and 0.066 g of the following compound (III) was added thereto. Then, the mixture was stirred at 75° C. for 3 hours. After the completion of the reaction, the reaction mixture was cooled to 0° C. and filtered. Then cakes were subjected to repetition of methanol washing and cooling and ultimately dried, whereby a desired compound was obtained. Yield: 0.92 g

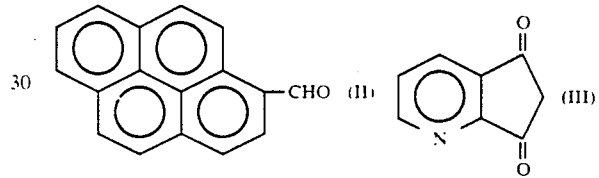

| Elemental analysis | Found (%) | Calculated (%) |
|---|---|---|
| C | 83.70 | 83.55 |
| H | 3.61 | 3.65 |
| N | 3.95 | 3.90 |

The present electrophotographic photosensitive member has a photosensitive layer containing a compound represented by the formula (1) on an electroconductive support.

The photosensitive layer can take any well-known form, and a function-separated type photosensitive layer in which a charge transport layer containing a charge transporting material is laminated on a photosensitive layer containing as a charge generation layer a compound represented by the general formula (1) is particularly preferred.

The charge generation layer can be formed by applying a coating solution containing a compound represented by the general formula (1) as dispersed in an appropriate solvent together with a binder resin to an electroconductive support by a well known method. A film thickness of the charge generation layer is, for example, not more than 5 μm, preferably 0.1 to 1 μm.

The binder resin to be used may be selected from a wide range of insulating resins and organic photoconductive polymers, which preferably includes polyvinylbutyral, polyvinylbenzal, polyallylate, polycarbonate, polyester, phenoxy resin, cellulose-based resin, acrylic resin, urethane resin, etc. and its amount to be used is not more than 80% by weight, preferably not more than 40% by weight in terms of the content in the charge generation layer.

It is also preferable to select a solvent from those capable of dissolving the resin but incapable of dissolving the charge transport layer or an underlayer, which will be explained later. Examples of the solvent include ethers such as tetrahydrofuran, 1,4-dioxane, etc.; ketones such as cyclohexanone, methylethylketone, etc.; amides such as N,N-dimethylformamide, etc.; esters such as methyl acetate, ethyl acetate, etc.; aromatic compounds such as toluene, xylene, chlorobenzene, etc.; alcohols such as methanol, ethanol, 2-propanol, etc.; and aliphatic hydrocarbons such as chloroform, methylene chloride, dichloroethylene, carbon tetrachloride, trichloroethylene, etc.

The charge transport layer is laid on the charge generation layer as an upper layer or lower layer with respect to the charge generation layer and has a function to receive charge carriers from the charge generation layer in the presence of an electric field and transport them up to the surface.

The charge transport layer can be formed by applying a coating solution containing a charge transport material as dissolved in a solvent, together with an appropriate binder resin, if required, and its film thickness is generally 5 to 40 μm, preferably 15 to 30 μm.

The charge transporting material includes an electron transporting material and a hole transporting material. Examples of the electron transporting material include electron-attracting materials such as 2,4,7-trinitrofluorenone, 2,4,5,7-tetranitrofluorenone, chloranil, tetracyanoquinodimethane, etc., and polymerization products of these electro-attracting materials. Examples of the hole transporting materials include polycyclic aromatic compounds such as pyrene, anthracene, etc.; heterocyclic compounds such as carbazoles, indoles, imidazoles, oxazoles, thiazoles, oxadiazoles, pyrazoles, pyrazolines, thiadiazoles, triazoles, etc.; hydrazone compounds such as p-diethylaminobenzaldehyde-N,N-diphenyl-hydrazone, N,N-diphenylhydrazino-3-methylidene-9-ethylcarbazole, etc.; styryl compounds such as α-phenyl-4'-N,N-diphenylamino-stilbene, 5-[4-(di-p-tolylamino)benzylidene]-5H-dibenzo[a,d]cycloheptene, etc.; benzidine compounds, triarylmethane compounds, triphenylamines and polymers having a group comprising at least one of these compounds at the main chain or side chain, for example, poly-N-vinylcarbazole, polyvinylanthracene, etc.

Besides these organic charge transporting materials, inorganic material such as selenium-tellurium, amorphous silicon, cadmium sulfide, etc. can be used.

These organic charge transporting materials can be used alone or in combination of at least two thereof.

When the charge transporting material has no film formability, an appropriate binder resin can be used. Examples of the binder resin include insulating resin such as acrylic resin, polyallylate, polyester, polycarbonate, polystyrene, acrylonitrile-styrene copolymer, polyacrylamide, polyamide, chlorinated rubber, etc., and organic photoconductive polymers such as poly-N-vinylcarbazole, polyvinylanthracene, etc.

As the electroconductive support, a metal or an alloy such as aluminum, aluminum alloy, stainless steel, etc. can be used.

Plastics having a vacuum vapor deposition film of the metal or alloy thereon, supports having a coating film of electroconductive particles, for example, carbon black particles, silver particles, etc. laid on plastic or metal supports together with an appropriate binder resin, or supports of plastics or paper impregnated with electroconductive particle may be used.

The electroconductive support may have any form, such as a sheet form or a drum form.

It is also possible to provide an undercoating layer having both a barrier function and an adhesive function between the electroconductive support and the photosensitive layer. The undercoating layer can be formed with casein, polyvinyl alcohol, nitrocellulose, polyamide (nylon 6, nylon 66, nylon 610, copolymerized nylon, alkoxymethylated nylon, etc.), polyurethane, aluminum oxide, etc.

The undercoating layer has a film thickness of not more than 5 μm, preferably 0.1 to 3 μm.

Another embodiment of the present invention is an electrophotographic photosensitive member containing a compound represented by the general formula (1) and a charge transporting material in the same layer, where a charge transfer complex comprising poly-N-vinylcarbazole and trinitrofluorenone as a charge transporting material can be used. The electrophotographic photosensitive member of this embodiment can be formed by coating a dispersion of a compound represented by the general formula (1) and a charge transporting material in an appropriate resin solution, followed by drying.

The present electrophotographic photosensitive member may have a resin layer or a resin containing an electroconductive material as dispersed therein as a protective layer on the photosensitive layer by lamination.

The present electrophotographic photosensitive member is utilized not only in an electrophotographic copying machine, but also in other electrophotographic applications such as a laser beam printer, a CRT printer, a liquid crystal printer, a laser printing preparation, etc.

FIG. 1 shows a schematic structure of an ordinary transfer-type electrophotographic apparatus using a drum-type photosensitive member, wherein numeral 1 is a drum-type photosensitive member as an image carrier, which is driven to rotate at a predetermined peripheral speed around the axis 1a in the arrow direction, and the photosensitive member 1 receives a uniform charging at a predetermined positive or negative potential surface by a charging means 2 during the rotating process and then receives a photoimage exposure L (slit beam exposure, laser beam scanning exposure, etc.) at an exposure site 3 by an image exposure means not shown in the drawings, whereby electrostatic latent images are successively formed on the peripheral surface of the photosensitive member.

Then, the electrostatic latent images are developed with a toner by a developing means, and the toner-developed images are successively transferred by a transfer means 5 onto the surface of a transfer material P fed between the photosensitive member 1 and the transfer medium 5 synchronically with their rotation from a paper feed means not shown in the drawing.

The image-transferred transfer material P is separated from the surface of photoresistive member and led to an image-fixing means 8, where the image is fixed. Then, the fixed image is printed out to the outside as a copy.

After the image transfer, the surface of photosensitive member 1 is cleaned by a cleaning means 6 to remove the toner remaining after the transfer, and is used for repetitive image formations.

As the uniform charging means 2 for the photosensitive member 1, a corona charger is widely used in general. As the transfer means 5, a corona transfer means is widely used in general. As the electrophotographic apparatus, a plurality of constituent members such as the above-mentioned photosensitive member, a developing means, a cleaning means, etc. may be integrally combined as a unit, and the unit may be provided detachably on the apparatus proper.

For example, the photosensitive member 1 and the cleaning means 5 are integrally combined to form a unit, and the unit may be provided detachably on the apparatus proper by a guide means such as a rail, etc. In that case, the unit may have a charging means and/or a developing means.

When the electrophotographic apparatus is used as a copying machine or a printer, the photo-image exposure can be carried out by using reflected lights or transmitted lights on or from a manuscript, or reading and forming information signals from the manuscript and scanning a laser beam or driving a photo emission diode array or driving a liquid crystal shutter array by the signals. When it is used as a facsimile printer, the photo image exposure L is an exposure for printing received data.

Figure 2:
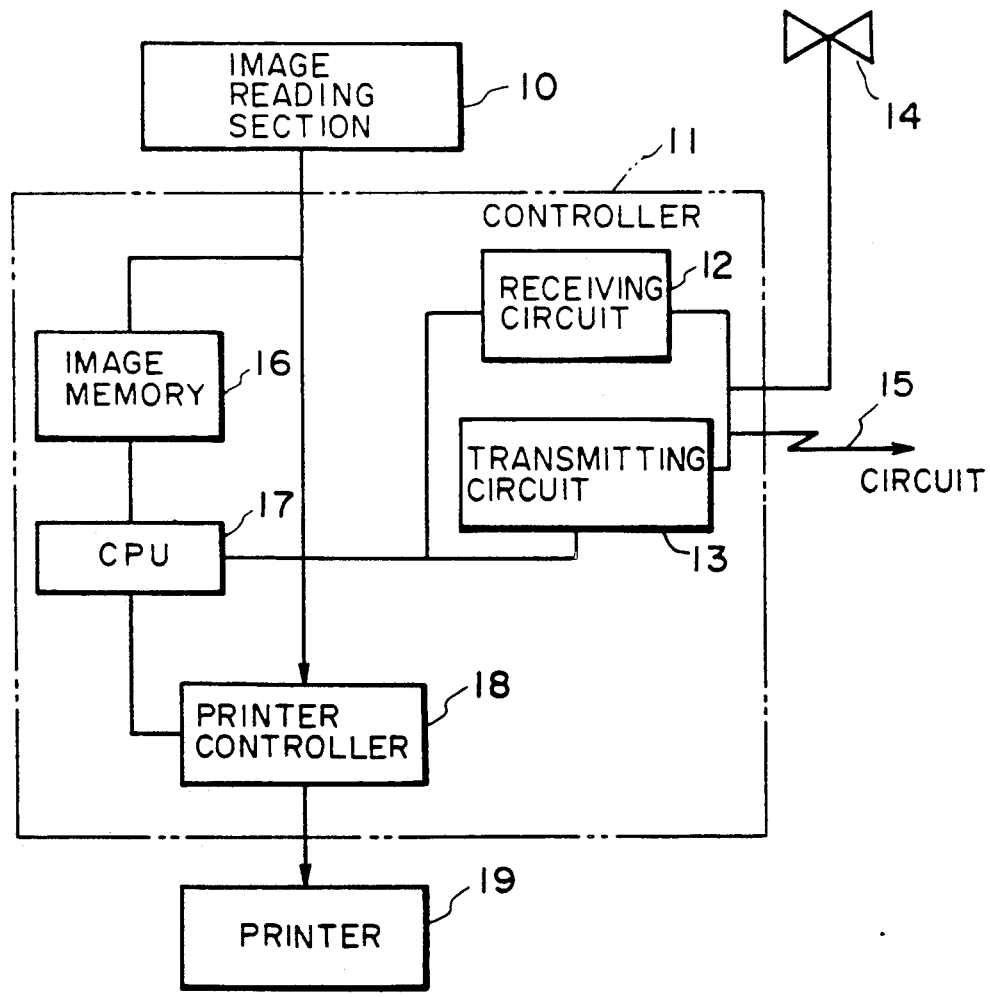
FIG. 2 is a facsimile block diagram using as a printer an electro-photographic apparatus using the present photosensitive member.

FIG. 2 is a block diagram showing one example of this case.

A controller 11 controls an image reading section 10 and a printer 19. The controller 11 is wholly controlled by CPU 17. The read data from the image reading section is transmitted to a corresponding station through a transmitting circuit 13. The data received from the corresponding station is sent to the printer 19 through a receiving circuit 12. In an image memory desired image data are memorized. A printer-controller 18 controls the printer 19. Numeral 14 is a telephone.

The image received from the circuit 15 (image information from a remote terminal connected through the circuit) is remodulated, and then CPU 17 decodes the image information, which is successively put in the image memory 16. When at least one page of image is put in the memory 16, image recording of the page is carried out. CPU sends one page of decoded image information to a printer-controller 18 after reading-out of one page of image information from the memory 16. When the printer-controller 18 receives one page of image information from CPU 17, it controlls the printer 19 to make an image information recording of that page.

CPU 17 receives signals of next page during the recording by the printer 19.

Signal receiving and recording of images are carried out in the foregoing manner.

EXAMPLES 1 TO 20

A solution containing 5 g of methoxymethylated nylon resin (number average molecular weight: 32,000) and 10 g of alcohol-soluble copolymer nylon resin (number average molecular weight: 29,000) dissolved in 95 g of methanol was applied to an aluminum substrate by a Meyer bar to form an undercoating layer having a film thickness of 1 μm after drying.

Then, a solution containing 5 g of Compound (7) dissolved in 95 g of cyclohexanone, admixed with 2 g of butyral resin (degree of butyralation: 63% by mole), was subjected to dispersion in a sand mill for 20 hours. The resulting dispersion was applied to the previously formed undercoating layer to a film thickness of 0.2 μm after drying by a Meyer bar to form a charge generation layer.

Then, 5 g of hydrazone compound represented by the following structural formula and 5 g of polymethyl- methacrylate resin (number average molecular weight: 100,000) were dissolved in 40 g of monochlorobenzene, and the resulting solution was applied to the charge generation layer by a Meyer bar and dried to form a charge transport layer having a film thickness of 20 μm, whereby a photosensitive member of Example 1 was prepared.

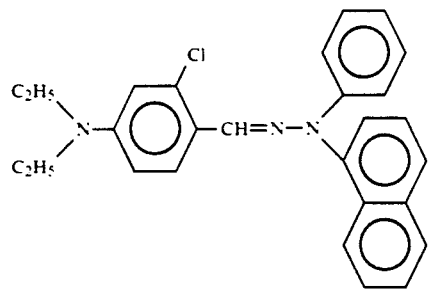

Then, compounds given in Table 1 were used in place of Compound (7) to prepare photosensitive members of Examples 2 to 20 in the same manner as above.

The electrophotographic photosensitive members thus prepared were subjected to evaluation of charging characteristics by negatively charging them with corona discharge at −5 kV in an electrostatic copy paper tester (Model SP-428, made by Kawaguchi Denki K.K., Tokyo), bearing them in a dark place for one second, and exposing them to a light of 10 lux from a halogen lamp.

As to the charging characteristics, the surface potential ($V_0$) and a the amount of light exposure $E_{\frac{1}{2}}$ necessary for decaying to one half the potential after standing at a dark place for 1 second were measured. The results are shown in Table 1.

It was found from these results that the present electrophotographic photosensitive members have a satisfactory chargeability and a distinguished sensitivity.

TABLE 1

| Example No. | Compound | Surface Potential $V_0$ (-V) | $E_{\frac{1}{2}}$ (lux·sec) |
|---|---|---|---|
| 1 | (7) | 685 | 2.3 |
| 2 | (13) | 690 | 1.2 |
| 3 | (14) | 655 | 1.7 |
| 4 | (21) | 675 | 2.0 |
| 5 | (24) | 675 | 1.9 |
| 6 | (31) | 700 | 1.2 |
| 7 | (37) | 675 | 2.3 |
| 8 | (41) | 705 | 1.8 |
| 9 | (43) | 695 | 0.9 |
| 10 | (48) | 680 | 2.4 |
| 11 | (52) | 690 | 3.5 |
| 12 | (53) | 700 | 2.9 |
| 13 | (58) | 650 | 4.3 |
| 14 | (62) | 700 | 2.4 |
| 15 | (64) | 625 | 1.1 |
| 16 | (67) | 695 | 1.3 |
| 17 | (70) | 660 | 2.0 |
| 18 | (72) | 650 | 3.6 |
| 19 | (91) | 675 | 0.7 |
| 20 | (97) | 675 | 2.0 |

EXAMPLES 21 TO 30

Photosensitive members were prepared and evaluated in the same manner as in Example 1, except that a compound represented by the following structural formula was used in place of the hydrazone used in Example 1 and the present compounds given in Table 2 were used. The results are shown in Table 2.

TABLE 2

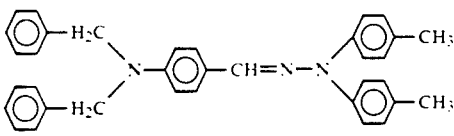

| Example No. | Compound | $V_0(-V)$ | $E_i$ (lux · sec) |
|---|---|---|---|
| 21 | (101) | 720 | 3.22 |
| 22 | (102) | 710 | 3.96 |
| 23 | (103) | 700 | 3.82 |
| 24 | (104) | 720 | 1.61 |
| 25 | (105) | 720 | 1.53 |
| 26 | (106) | 650 | 3.24 |
| 27 | (107) | 680 | 3.62 |
| 28 | (108) | 680 | 3.28 |
| 29 | (109) | 700 | 2.05 |
| 30 | (110) | 710 | 1.86 |

EXAMPLES 31 TO 50

Photosensitive members were prepared and evaluated in the same manner as in Example 1, except that a compound having the following structural formula was used in place of the hydrazone compound used in Example 1 and the present compounds given in Table 3 were used. The results are shown in Table 3.

TABLE 3

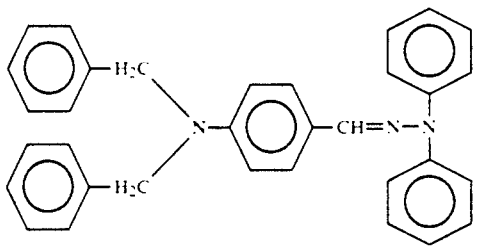

| Example No. | Compound | $V_0(-V)$ | $E_i$ (lux · sec) |
|---|---|---|---|
| 31 | (111) | 695 | 2.5 |
| 32 | (112) | 680 | 2.1 |
| 33 | (113) | 705 | 2.0 |
| 34 | (114) | 700 | 7.3 |
| 35 | (115) | 700 | 3.2 |
| 36 | (116) | 700 | 6.9 |
| 37 | (117) | 690 | 4.4 |
| 38 | (118) | 695 | 1.9 |
| 39 | (119) | 710 | 1.7 |
| 40 | (120) | 695 | 1.3 |
| 41 | (121) | 690 | 1.8 |
| 42 | (122) | 700 | 2.9 |
| 43 | (123) | 705 | 2.3 |
| 44 | (124) | 710 | 2.5 |
| 45 | (125) | 715 | 3.3 |
| 46 | (126) | 710 | 2.9 |
| 47 | (127) | 685 | 4.1 |
| 48 | (128) | 695 | 7.2 |
| 49 | (129) | 700 | 3.5 |
| 50 | (130) | 700 | 3.9 |

EXAMPLE 51 TO 63

The electrophotographic photosensitive member prepared in Example 4 was pasted on the cylinder of an electrophotographic copying machine comprising a corona charger at −6.5 kV, and exposure optical system, a developer, a transfer charger, a decharging exposure optical system and a cleaner. The initial dark portion potential $V_D$ and light portion potential $V_L$ were set to −700 V and −200 V, respectively, and a variation in the dark portion potential ($\Delta V_D$) and a variation in the light portion potential ($\Delta V_L$) after used in 5,000 repetitions were measured.

The same evaluation as above was made on the photosensitive members prepared in Examples 7, 8, 15, 16, 20, 21, 23, 25, 28, 33, 39 and 40 and the results are shown in Table 4. The negative mark in the variation in the potential means a decrease in the absolute value of the potential, and the positive mark means an increase in the absolute value of the potential.

TABLE 4

| Example No. | Compound | Initial | | After used in 5,000 repetitions | |
|---|---|---|---|---|---|
| | | $V_D(-V)$ | $V_L(-V)$ | $\Delta V_D$ | $\Delta V_L$ |
| 51 | (21) | 700 | 200 | −25 | −5 |
| 52 | (37) | 700 | 200 | −25 | +10 |
| 53 | (41) | 700 | 200 | −30 | −5 |
| 54 | (64) | 700 | 200 | −30 | −5 |
| 55 | (67) | 700 | 200 | −20 | −5 |
| 56 | (97) | 700 | 200 | −15 | −15 |
| 57 | (101) | 700 | 200 | 0 | −10 |
| 58 | (103) | 700 | 200 | −5 | −25 |
| 59 | (105) | 700 | 200 | −5 | −5 |
| 60 | (108) | 700 | 200 | −10 | −10 |
| 61 | (113) | 705 | 200 | −5 | −5 |
| 62 | (119) | 705 | 205 | 0 | +10 |
| 63 | (120) | 695 | 200 | −20 | +10 |

EXAMPLE 64 TO 67

An undercoating layer of polyvinyl alcohol having a film thickness of 0.5 μm was formed on the aluminum surface of an aluminum-vapor deposited polyethylene terephthalate film. Then, the dispersion of the present compound used in Example 4 was applied to the undercoating layer by a Meyer bar and dried to form a charge generation layer having a film thickness of 0.2 μm.

A solution containing 5 g of a stylyl compound having the following structural formula and 5 g of polycarbonate resin (number average molecular weight: 55,000) dissolved in 40 g of tetrahydrofuran was applied to the charge generation layer and dried to form a charge transport layer having a film thickness of 20 μm, whereby a photosensitive member was prepared.

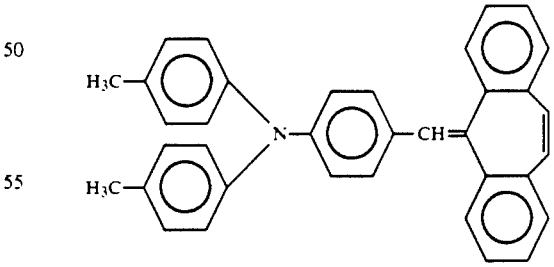

Then, other photosensitive members were prepared in the same manner as above except that the dispersions used in Examples 16, 21 and 40 were used, respectively, in place of the dispersion used in Example 4.

The charging characteristics of the thus prepared photosensitive members and variations in the potential when used in repetitions were measured in the same manner as in Example 51. The results are shown in Table 5.

TABLE 5

| Example No. | Compound | $V_0$ (-V) | $E_{\frac{1}{2}}$ (lux sec) | $\Delta V_D$ (V) | $\Delta V_L$ (V) |
|---|---|---|---|---|---|
| 64 | 21 | 690 | 1.5 | −20 | 3 |
| 65 | 67 | 700 | 1.2 | −10 | 5 |
| 66 | 101 | 730 | 2.87 | 0 | 5 |
| 67 | 120 | 700 | 1.5 | — | — |

EXAMPLE 68 TO 71

Photosensitive members comprising a charge generation layer and a charge transport layer formed in the reversed order to that of the photosensitive members prepared in Examples 7, 19, 21 and 40 were prepared, and the charging characteristics of the respective photosensitive members were evaluated in the same manner as in Example 1. The results are shown in Table 6. The charging was positive charging.

TABLE 6

| Example No. | Compound | $V_0$ (V) | $E_{\frac{1}{2}}$ (lux sec) |
|---|---|---|---|
| 68 | (37) | 650 | 2.5 |
| 69 | (91) | 700 | 0.8 |
| 70 | (101) | 760 | 3.5 |
| 71 | (120) | 680 | 3.2 |

EXAMPLES 72 TO 74

A solution containing 5 g of 2,4,7,-trinitro—9-fluorenone and 5 g of poly—4,4-dioxydiphenyl-2,2'-propane-carbonate (molecular weight: 300,000) dissolved in 50 g of tetrahydrofuran was applied to the charge generation layers prepared in Examples 7, 20 and 40 by a Meyer bar and dried to form a charge transport layer having a film thickness of 18 μm.

The charging characteristics of thus prepared electrophotographic photosensitive members were evaluated. The results are shown in Table 7. The charging was positive charging.

TABLE 7

| Example No. | Compound | $V_0$ (V) | $E_{\frac{1}{2}}$ (lux sec) |
|---|---|---|---|
| 72 | 37 | 675 | 3.5 |
| 73 | 97 | 675 | 3.1 |
| 74 | 120 | 680 | 3.9 |

EXAMPLES 75 TO 77

0.5 g of compound (28) and 9.5 g of cyclohexanone were subjected to dispersion in a paint shaker for 5 hours, and then thereto were added a solution containing 5 g of the charge transport material used in Example 1 and 5 g of polycarbonate resin dissolved in 40 g of tetrahydrofuran. The mixture was further shaked for one hour. The thus prepared coating solution was applied to an aluminum substrate by a Meyer bar and dried to form a photosensitive layer having a film thickness of 20 μm, whereby a photosensitive member was prepared.

Other photosensitive member were prepared in the same manner as above except that compounds (68) and (120) were used in place of Compound (28).

The charging characteristics of the thus prepared electrophotographic photosensitive members were evaluated in the same manner as in Example 1. The results are shown in Table 8. The charging was positive charging.

TABLE 8

| Example No. | Compound | $V_0$ (V) | $E_{\frac{1}{2}}$ (lux sec) |
|---|---|---|---|
| 75 | (28) | 620 | 2.4 |
| 76 | (68) | 625 | 2.5 |
| 77 | (120) | 695 | 4.3 |

COMPARATIVE EXAMPLES 1 AND 2

Electrophotographic photosensitive members were prepared in the same manner as in Example 1 and evaluated in the same manner as in Example 64, except that compounds (1) and (2) having the following structural formulae were used in place of compound (7) of Example 1. The results are shown in Table 9.

Comparative Compound (1)

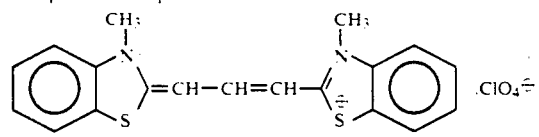

Comparative Compound (2)

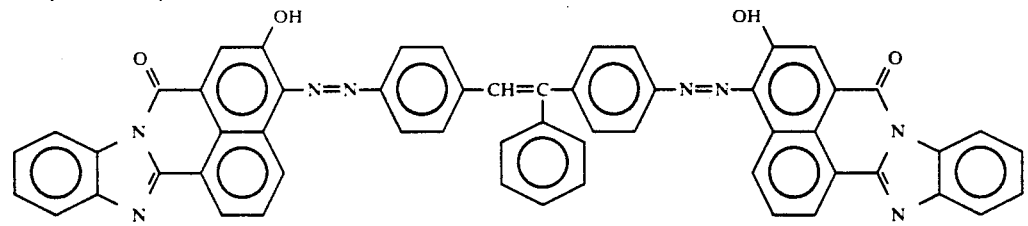

COMPARATIVE EXAMPLES 3 AND 4

Electrophotographic photosensitive members were prepared in the same manner as in Example 21 and evaluated in the same manner as in comparative Example 1, except that compounds (3) and (4) having the following structural formulae were used in place of compound (101) of Example 21. The results are shown in Table 9.

TABLE 9

Comparative compound (3)

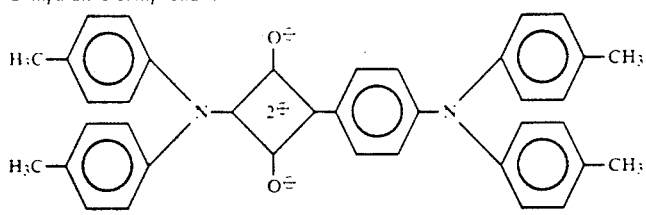

Comparative compound (4)

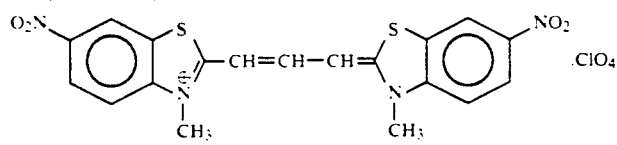

| Comp Ex No. | Comp. Compound | Initial V₀(−V) | E₁ (lux·sec) | After used in 5,000 repetitions ΔV_D(V) | ΔV_L(V) |
|---|---|---|---|---|---|
| 1 | (1) | 620 | 5.3 | −250 | 125 |
| 2 | (2) | 570 | 4.9 | −110 | 70 |
| 3 | (3) | 670 | 8.74 | −195 | 120 |
| 4 | (4) | 710 | 10.09 | −245 | 85 |

We claim:

1. An electrophotographic photosensitive member, which comprises an electroconductive support and a photosensitive layer on the electroconductive support, the photosensitive layer containing a compound represented by the following general formula (1):

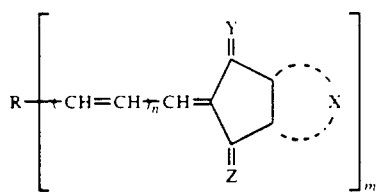

wherein R is a substituted or unsubstituted aromatic condensed polycyclic group or aromatic amine; X is substituted or unsubstituted benzenediyl, 2,3-pyridinediyl, 3,4-pyridinediyl or 2,3-pyrazinediyl; Y is an oxygen atom, a sulfur atom or a dicyanomethylene group, Z is an oxygen atom, a sulfur atom, a dicyanomethylene group or

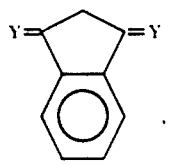

m is an integer of 2 or 3; and n is an integer of 0 or 1.

2. An electrophotographic photosensitive member according to claim 1, wherein R is an electron donor to

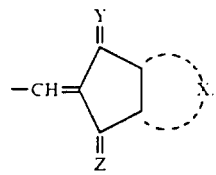

3. An electrophotographic photosensitive member according to claim 1, where X has a substituent at the third position.

4. An electrophotographic photosensitive member according to claim 1, wherein the photosensitive layer is a function-separated type photosensitive layer comprising a lamination of a charge generation layer containing the compound represented by the general formula (1) and the charge transport layer containing a charge transporting material, laid on the electroconductive support.

5. An electrophotographic photosensitive member according to claim 4, wherein the charge generation layer and the charge transport layer are laid in this order on the electroconductive support.

6. An electrophotographic photosensitive member according to claim 4, wherein the charge transport layer and the charge generation layer are laid in this order on the electroconductive support.

7. An electrophotographic photosensitive member according to claim 1, wherein the compound represented by the general formula (1) and the charge transport material are contained in one layer.

8. An electrophotographic photosensitive member according to claim 1, wherein an undercoating layer is provided between the electroconductive support and the photosensitive layer.

9. An electrophotographic photosensitive member according to claim 1, wherein a protective layer is provided on the photosensitive layer.

10. An electrophotographic apparatus, which comprises an electrographic photosensitive member comprising an electroconductive support and a photosensitive layer on the electroconductive support, the photosensitive layer containing a compound represented by the following general formula (1):

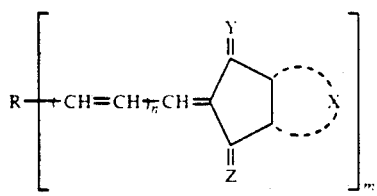

wherein R is a substituted or unsubstituted aromatic condensed polycyclic group or aromatic amine; X is substituted or unsubstituted benzenediyl, 2,3-pyridinediyl, 3,4-pyridinediyl or 2,3-pyrazinediyl; Y is an oxygen atom, a sulfur atom or a dicyanomethylene group, Z is an oxygen atom, a sulfur atom, a dicyanomethylene group or

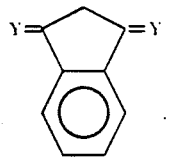

m is an integer of 2 or 3; and n is an integer of 0 or 1.

11. A facsimile which comprising an electrographic apparatus having a photosensitive member comprising an electroconductive support and a photosensitive layer on the electroconductive support, and a signal-receiving means for receiving image information from a remote terminal, the photosensitive layer containing a compound represented by the following general formula (1):

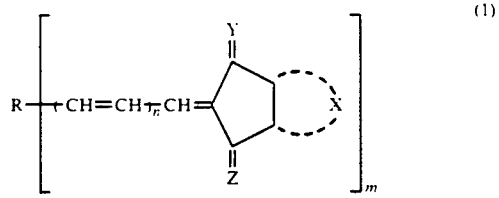

wherein R is a substituted or unsubstituted aromatic condensed polycyclic group or aromatic amine; X is substituted or unsubstituted benzenediyl, 2,3-pyridinediyl, 3,4-pyridinediyl or 2,3-pyrazinediyl; Y is an oxygen atom, a sulfur atom or a dicyanomethylene group, Z is an oxygen atom, a sulfur atom, a dicyanomethylene group or

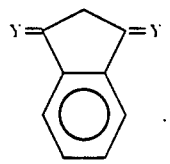

m is an integer of 2 or 3; and n is an integer of 0 or 1.

* * * * *

UNITED STATES PATENT AND TRADEMARK OFFICE
CERTIFICATE OF CORRECTION

PATENT NO. : 5,112,759

DATED : May 12, 1992

INVENTOR(S) : AKIHIRO SENOO, ET AL.

It is certified that error appears in the above-identified patent and that said Letters Patent is hereby corrected as shown below:

On title page, item
 [56] REFERENCES CITED

Under U.S. PATENT DOCUMENTS,
  "4,621,038  6/1986  Kazmaier et al." should read
  --4,621,038  11/1986  Kazmaier et al.--.

IN [57] ABSTRACT

Last line, "1" should read --1,--.

COLUMN 1

Line 33, "transports" should read --transport--.
 Line 47, "squarium pigment," should read
   --squarylium pigment--.

COLUMN 3

Line 6, "Examples" should read --examples--.

COLUMN 4

Line 4, "nitro,;" should read --nitro;--.

COLUMN 9

Compound (27), "$_2(CH_3)N_\backslash$" should read --$(CH_3)_2N-$ --.

COLUMN 31

Compound (100), "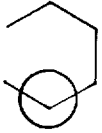" should read --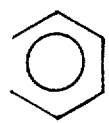--.

UNITED STATES PATENT AND TRADEMARK OFFICE
CERTIFICATE OF CORRECTION

PATENT NO. : 5,112,759
DATED : May 12, 1992
INVENTOR(S) : AKIHIRO SENOO, ET AL.

It is certified that error appears in the above-identified patent and that said Letters Patent is hereby corrected as shown below:

COLUMN 49

Line 44, "controlls" should read --controls--.

COLUMN 50

Line 34, "a" should be deleted.

COLUMN 51

Line 62, "EXAMPLE" should read --EXAMPLES--.

COLUMN 52

Line 4, "used in" should be deleted.
TABLE 4, "used in" should be deleted.
Line 31, "EXAMPLE" should read --EXAMPLES--.

COLUMN 53

Line 10, "EXAMPLE" should read --EXAMPLES--.
Line 13, "reversed" should read --reverse--.

COLUMN 54

Line 8, "shaked" should read --shaken--.
Line 14, "member" should read --members--.

COLUMN 55

TABLE 9, "used in" should be deleted.

UNITED STATES PATENT AND TRADEMARK OFFICE
CERTIFICATE OF CORRECTION

PATENT NO. : 5,112,759

DATED : May 12, 1992

INVENTOR(S) : AKIHIRO SENOO, ET AL.

Page 3 of 3

It is certified that error appears in the above-identified patent and that said Letters Patent is hereby corrected as shown below:

<u>COLUMN 57</u>

Line 30, "A facsimile which comprising an electrographic" should read --A facsimile printer which comprises an electrophotographic--.

Signed and Sealed this

Third Day of August, 1993

Attest:

MICHAEL K. KIRK

*Attesting Officer*     *Acting Commissioner of Patents and Trademarks*